United States Patent
Buchholtz et al.

(10) Patent No.: US 9,892,396 B2
(45) Date of Patent: Feb. 13, 2018

(54) MULTI-POINT AUTHENTICATION FOR PAYMENT TRANSACTIONS

(71) Applicant: International Business Machines Corporation, Armonk, NY (US)

(72) Inventors: Timothy C. Buchholtz, Rochester, MN (US); Morgan D. Davis, Rochester, MN (US); Daniel Ramirez, Rochester, MN (US); Michael J. Rohn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 14/662,323

(22) Filed: Mar. 19, 2015

(65) Prior Publication Data

US 2016/0275508 A1 Sep. 22, 2016

(51) Int. Cl.
*G06Q 20/40* (2012.01)
*G06Q 20/32* (2012.01)
(Continued)

(52) U.S. Cl.
CPC ......... *G06Q 20/204* (2013.01); *G06Q 20/202* (2013.01); *G06Q 20/325* (2013.01);
(Continued)

(58) Field of Classification Search
None
See application file for complete search history.

(56) References Cited

U.S. PATENT DOCUMENTS 8,347,370 B2   1/2013   Headley
8,365,988 B1 *  2/2013   Medina, III ........... G06Q 20/28
                                                        235/380
(Continued)

FOREIGN PATENT DOCUMENTS

CN   101894424 A      11/2010
EP     1802155 A1 *   6/2007 ............. G06Q 20/32
(Continued)

OTHER PUBLICATIONS

Internet Society et al., "Authentication Mechanisms for ONC RPC (RFC2695)", An IP.com Prior Art Database Technical Disclosure, IP.com No. IPCOM000003288D, original publication: Sep. 1, 1999, electronic publication: Sep. 13, 2000, Copyright (C) The Internet Society (1999). http://ip.com/IPCOM/000003288.

(Continued)

*Primary Examiner* — Scott A Zare
(74) *Attorney, Agent, or Firm* — Nathan M. Rau

(57) ABSTRACT

Authentication includes receiving an indication of physical possession of a payment card by a merchant and receiving a purchase request for an authorization of an exchange from the payment account of the cardholder to the merchant. Authentication includes assigning a randomized transaction identifier to the request for the authorization of the exchange. The method also includes transmitting the request for the authorization of the exchange from the payment account of the cardholder to the merchant and receiving the assigned randomized transaction identifier and a randomized authentication identifier associated with the randomized transaction identifier from a payment association, the payment association determining whether the request for the authorization of the exchange is valid. Authentication includes transmitting a copy of the randomized authentication identifier to the mobile device and receiving validation that the transmitted copy of the randomized authentication (Continued)

identifier from the mobile device matches the randomized authentication identifier.

10 Claims, 14 Drawing Sheets

(51) Int. Cl.
*G06Q 20/20* (2012.01)
*G06Q 20/34* (2012.01)
*G06Q 20/38* (2012.01)
*G06Q 20/42* (2012.01)

(52) U.S. Cl.
CPC ..... *G06Q 20/3227* (2013.01); *G06Q 20/3274* (2013.01); *G06Q 20/3278* (2013.01); *G06Q 20/34* (2013.01); *G06Q 20/385* (2013.01); *G06Q 20/40* (2013.01); *G06Q 20/4012* (2013.01); *G06Q 20/40145* (2013.01); *G06Q 20/425* (2013.01)

(56) References Cited

U.S. PATENT DOCUMENTS

| | | | |
|---|---|---|---|
| 8,468,582 B2 | 6/2013 | Kuang et al. | |
| RE44,669 E * | 12/2013 | Stambaugh | G06Q 20/027 705/30 |
| 8,620,810 B2 | 12/2013 | Karantzis | |
| 2002/0052842 A1* | 5/2002 | Schuba | G06Q 20/12 705/40 |
| 2008/0103984 A1* | 5/2008 | Choe | G06O 20/20 705/76 |
| 2009/0057393 A1 | 3/2009 | Merkow et al. | |
| 2011/0137797 A1* | 6/2011 | Stals | G06O 20/02 705/44 |
| 2011/0191244 A1* | 8/2011 | Dai | G06O 20/40 705/44 |
| 2011/0191252 A1* | 8/2011 | Dai | G06O 20/10 705/71 |
| 2012/0129492 A1* | 5/2012 | Mechaley, Jr. | G06Q 20/027 455/411 |
| 2012/0157062 A1 | 6/2012 | Kim et al. | |
| 2013/0030934 A1 | 1/2013 | Bakshi et al. | |
| 2013/0132181 A1 | 5/2013 | Fisher | |
| 2013/0297509 A1 | 11/2013 | Sebastian et al. | |
| 2014/0358777 A1* | 12/2014 | Gueh | G06Q 20/3223 705/43 |
| 2015/0348044 A1* | 12/2015 | Smith | G06Q 20/4018 705/72 |

FOREIGN PATENT DOCUMENTS

| | | | |
|---|---|---|---|
| WO | 0205224 A2 | 1/2002 | |
| WO | WO-2005001670 A2 * | 1/2005 | ............. G06Q 10/10 |

OTHER PUBLICATIONS

Internet Society et al., "Secret Key Transaction Authentication for DNS (TSIG)(RFC2845)", An IP.com Prior Art Database Technical Disclosure, IP.com No. IPCOM000003443D, original publication: May 1, 2000, electronic publication: Sep. 13, 2000, Copyright (C) The Internet Society (2000). http://ip.com/IPCOM/000003443.
Internet Society et al., "Generic Security Service Algorithm for Secret Key Transaction Authentication for DNS (GSS-TSIG)(RFC3645)", An IP.com Prior Art Database Technical Disclosure, IP.com No. IPCOM000019904D, original publication: Oct. 1, 2003, electronic publication: Oct. 9, 2003, Copyright (C) The Internet Society (2003). http://ip.com/IPCOM/000019904.
Stokes, N., "The Good, the Bad & the Ugly of Mobile Payments", Techlicious, Sep. 24, 2014. http://www.techlicious.com/tip/what-you-need-to-know-about-paying-with-your-smartphone/.
Buchholtz et al., "Multi-Point Authentication for Payment Transactions", U.S. Appl. No. 14/662,315, filed Mar. 19, 2015.
Buchholtz et al., "Multi-Point Authentication for Payment Transactions", U.S. Appl. No. 14/662,329, filed Mar. 19, 2015.
Buchholtz et al., "Multi-Point Authentication for Payment Transactions", U.S. Appl. No. 14/669,596, filed Mar. 26, 2015.
Buchholtz et al., "Multi-Point Authentication for Payment Transactions", U.S. Appl. No. 14/669,626, filed Mar. 26, 2015.
Buchholtz et al., "Multi-Point Authentication for Payment Transactions", U.S. Appl. No. 14/669,659, filed Mar. 26, 2015.
Unknown, "Google 2-Step Verification", printed: Mar. 16, 2015, pp. 1-4. http://www.google.com/landing/2step/.
Unknown, "3-D Secure", Wikipedia, The Free Encyclopedia, printed: Mar. 17, 2015, pp. 1-5. http://en.wikipedia.org/wiki/3-D_Secure.
Unknown, "Transaction Detail", Authorize.Net, LLC, printed: Mar. 17, 2015, pp. 1-3. https://www.authorize.net/support/CP/helpfiles/Search/Transaction_Detail/Transaction_Detail_Page.htm.
Unknown, "Transaction Details", PayPalObjects.com, printed: Mar. 17, 2015, pp. 1-2. https://www.paypalobjects.com/en_US/vhelp/paypalmanager_help/transaction_details.htm.
List of IBM Patents or Patent Applications Treated as Related, Signed Mar. 24, 2015, 2 pages.
International Search Report and Written Opinion dated Jun. 20, 2016 for PCT/CN2016/076594, 11 pages.

* cited by examiner

MULTI-POINT AUTHENTICATION FOR PAYMENT TRANSACTIONS

BACKGROUND

The present disclosure relates to payment authentication, and, more specifically, to multi-point authentication for payment transactions.

Payment cards, such as debit and credit cards, have become nearly ubiquitous ways of paying for purchases. By using a payment card tied to a credit or debit account, as opposed to cash, certain security risks may arise. As financial and privacy breaches have spread, security in transactions has become increasingly important. As a result, it can be beneficial to increase security in many aspects of the usage of payment cards and associated transactions.

SUMMARY

Embodiments of the present disclosure provide for a method, system, and computer program product for multi-point authentication for payment transactions.

One embodiment is directed toward a method for multi-point authentication for payment transactions. The method includes receiving, by a point-of-sale (POS) terminal, a first indication that a payment account of a cardholder is associated with a mobile device of the cardholder. The method also includes receiving, by the POS terminal, a second indication of physical possession of a payment card by a merchant. The method also includes receiving, by the POS terminal, a purchase request for an authorization of an exchange of funds from the payment account of the cardholder to the merchant. The method also includes assigning, by the POS terminal, a randomized transaction identifier to the request for the authorization of the exchange of funds. The method also includes transmitting, by the POS terminal, the request for the authorization of the exchange of funds from the payment account of the cardholder to the merchant. The method also includes receiving, by the POS terminal, the assigned randomized transaction identifier and a randomized authentication identifier associated with the randomized transaction identifier from a payment association, the payment association determining whether the request for the authorization of the exchange of funds is valid. The method also includes transmitting, by the POS terminal, a copy of the randomized authentication identifier to the mobile device. The method also includes receiving, by the POS terminal, validation that the transmitted copy of the randomized authentication identifier from the mobile device matches the randomized authentication identifier.

Another embodiment is directed toward a system for use with a host payment association server that is configured to validate transactions of a payment account and communicate with a linked mobile device that is configured to validate payment transactions. The system includes one or more computer processor circuits that are configured to host a transaction validation application. The transaction validation application is configured to receive, by a point-of-sale (POS) terminal, a first indication that a payment account of a cardholder is associated with a mobile device of the cardholder. The transaction validation application is also configured to receive, by the POS terminal, a second indication of physical possession of a payment card by a merchant. The transaction validation application is also configured to receive, by the POS terminal, a purchase request for an authorization of an exchange of funds from the payment account of the cardholder to the merchant. The transaction validation application is also configured to assign, by the POS terminal, a randomized transaction identifier to the request for the authorization of the exchange of funds. The transaction validation application is also configured to transmit, by the POS terminal, the request for the authorization of the exchange of funds from the payment account of the cardholder to the merchant. The transaction validation application is also configured to receive, by the POS terminal, the assigned randomized transaction identifier and a randomized authentication identifier associated with the randomized transaction identifier from a payment association, the payment association determining whether the request for the authorization of the exchange of funds is valid. The transaction validation application is also configured to transmit, by the POS terminal, a copy of the randomized authentication identifier to the mobile device. The transaction validation application is also configured to receive, by the POS terminal, validation that the transmitted copy of the randomized authentication identifier from the mobile device matches the randomized authentication identifier.

Another embodiment is directed toward a computer program product for managing a community merge operation.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
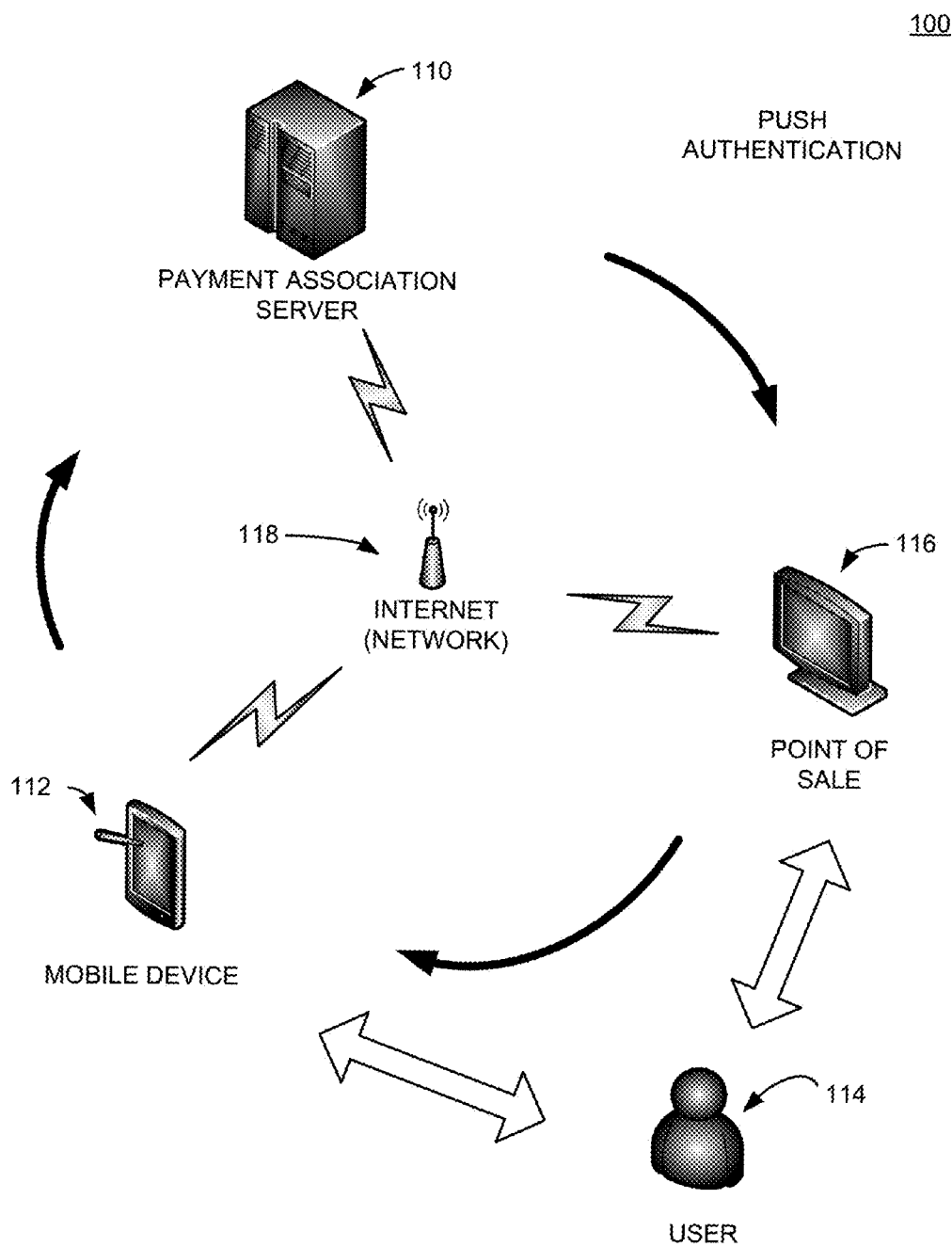
FIG. 1 depicts a system for push payment authentication, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to payment authentication, and, more specifically, to multi-point authentication for payment transactions. While the present disclosure is not necessarily limited to such applications, various aspects of the disclosure may be appreciated through a discussion of various examples using this context.

In order to more securely allow for a customer to use a payment card to make a purchase, a mobile device, which belongs to or is rightfully possessed by the customer, may be utilized. The mobile device may be utilized to validate and verify that a purchase is being made by a customer who is the true cardholder, either through feedback on the mobile device by the user, or by transferring data between the mobile device and a point-of-sale. Alternatively, the transfer of data may occur from a point-of-sale to the mobile device. Through the mobile device, facilitated by a cardholder, the payment association that maintains the payment card in question is contacted, in order to validate whether the purchase is authorized by the true cardholder. The payment association may send or receive an authentication identifier, which would ultimately return to the payment association from either the point-of-sale or the mobile device, and would be validated by the payment association and authenticated if the received authentication identifier is correct. Otherwise the transaction may cancel, and no potentially fraudulent transfer or purchase may be made.

In much of the world, credit or debit cards are commonly used to pay for purchases, both in-store and online. During the process of making a purchase, especially during checkout, the security at a point-of-sale (POS) is often vulnerable and limited. The POS may require a cardholder to sign a physical receipt, a liquid-crystal display (LCD) card reader, or a touchscreen pad, or, alternatively, to enter a few-digit security code (e.g., a card verification value) found on the physical card itself (but generally not stored on the machine-readable magnetic stripe of the card). In some cases, in-store purchases may not require any sort of cardholder identification, and, for smaller purchases, may not even require a signature. Even in cases where a signature is required, the POS card readers' touchscreen quality, accuracy, and precision in signature recognition and reproduction is often so low that a customer may as well make a scribble or draw an "X" on the screen. The input signature generally lacks any usefully identifiable quality, rendering the signature nearly superfluous. This has led to some customers simply "going through the motions" when a signature is required. Even assuming the POS receives a perfect signature, however, the security given by a signature verification can only take effect after a sale has been made, and furthermore may only come into play once a purchase has been officially contested. This may cost time and money. It would be desirable to avoid this situation altogether.

Widely-publicized retail security breaches related to payment and financial services have underscored various security concerns in today's marketplace. During various breaches, names, addresses, card numbers, account numbers and even security codes for accounts and payment cards have been stolen or copied from millions of customers. Continuing challenges for merchants and consumers alike have since resulted. Security breaches of this sort often result from the loss or dissemination of sufficient information to allow others to effectively duplicate payment cards, especially if the information falls into the hands of a reasonably skilled and malicious hacker. Duplicate cards, either virtual or physical, under the current regime, could then be swiped or scanned at an in-store merchant or used for online purchases.

If a physical payment card is lost or if the card is duplicated, the stolen or duplicated card could be misused for at least as long as it takes the true cardholder or the payment association to suspect misuse and cancel. During even a brief time, a large number of fraudulent purchases could take place. Unfortunately, if illicit access is granted to a hacker having a stolen or a duplicate card, for instance, a debit card, the associated bank account could be completely depleted or even overdrawn. In the case of a credit card, a credit line may be maxed out or exceeded, leading to a variety of challenges for the true cardholder. The existing state of payment card security may cost consumers, merchants, and payment associations multiple millions of dollars each year, not only from direct losses, but also indirect losses stemming from damage to trust and resulting reduction of repeat business.

To minimize the security exposures as well as reduce the overall cost of doing business for the merchants and payment associations, multi-point security solutions are proposed, as described herein. Separation of a transaction into different locales, as described herein, may result in an increase in security for the transaction. In this way, a transaction may require not only a physical payment card, but also a mobile device associated with the true holder of the payment card. Hackers, who steal names, addresses, card or account numbers, and card verification value (CVV) codes would no longer have enough information to complete any transaction, since the other component(s) of authentication would be received from another source.

According to various embodiments, today's mobile network and applications (commonly referred to as "apps," for short) may supply a user (e.g., a consumer, customer, shopper, or cardholder) transaction-specific authorization codes from the payment association (referred to herein generally as "pull authentication") then in turn supply that code to the merchant to complete a transaction. Another embodiment may involve using a mobile device on a network and application to receive a transaction identifier and authorization identifier from the merchant and transmit the identifiers to the payment association (referred to herein generally as "push authentication") using a mobile app on the mobile device.

According to various embodiments, a user may choose to or be required to create or set up an account with a payment association, with a unique password and user name, on the website of the payment association. In some cases, the user may also divulge other identifying information, such as biometric data or voiceprints. According to various embodiments, identifying information may include geospatial data. The user may also obtain and install a mobile application, which may enable multi-point authentication. For additional security, the mobile application password may be made to be unique and different from the payment association website login user name and password, leading to even greater security.

As described herein, the eventual loss or misappropriation of payment card information by itself would not be enough for a user, legitimate or not, to complete a transaction. By extension, even a true cardholder may require additional authentication beyond a physical payment card, personal identification number, and/or signature to make a purchase. Stated differently, the credit or debit card number either swiped or entered online becomes, as described herein, a mere ante to start a purchase and no longer an all-in proposition.

Malicious or otherwise, hackers who in the past had stolen millions of credit card numbers from merchants or cardholders would now, as described herein, effectively have useless payment card information, if standing alone. The hackers, not having the mobile device of the user, among other things, would not have the capacity to complete the remainder of the transaction authorization process through the mobile app (provided the hackers did not steal the mobile device or gain unauthorized access to it), resulting in little or no damage to cardholder, merchant or payment association. Even a delay in the hackers accessing a payment account or using a payment card may be enough for a true cardholder to deactivate a payment account or change a payment card number.

According to embodiments, a cardholder may be a person who has possession of a physical payment card or the information stored on a payment card. A cardholder may also be referred to herein as a user, consumer, or customer, among others. The true cardholder, who is the authorized and authentic payment card and payment account holder, may also have a mobile device associated with a payment account that is configured to communicate with a payment association and/or a merchant point-of-sale.

According to embodiments, a payment association may signify a financial services company or companies. A payment association may facilitate electronic funds transfers between parties, where the parties may include consumers, banks, merchants, etc. A payment association, as used herein, may also encompass various financial institutions, including banks, credit unions, and various others. A payment association, as used herein, may also include various servers, devices, computers, and other machines that may be used to facilitate financial services. Additionally, a payment association may include various employees or contractors, performing various tasks and/or duties in the financial services industry, related to one or more financial institutions, according to various embodiments.

According to embodiments, a payment card may refer to what is commonly known as a credit card or a debit card. A credit card may allow a user to make a purchase or receive a cash advance without a positive account balance, whereas a debit card may act like a check from a checking or savings account, where the user has a positive balance that is debited when a purchase is made.

According to embodiments, a payment account may refer to a financial account maintained by a payment association, where the payment account is associated with a cardholder and a mobile device of the cardholder. The payment account may be a bank account, debit card account, a credit line associated with a credit card, or various other financial accounts.

According to embodiments, a point-of-sale (POS) or a POS terminal may be a location where a retail transaction is initiated and/or completed. Herein, a POS may denote a point-of-sale, or a point-of-sale terminal, according to various embodiments, and the terms may be used interchangeably throughout. For example, a customer may desire to make a purchase, the merchant may calculate the amount of money owed to complete the purchase, and the customer may make a payment to a retail merchant to complete the transaction, once validated. A POS may exist both in physical form and in computer or Internet-based form. The POS may contain other features, such as a personal identification number (PIN) pad, a magnetic stripe card reader, and/or a reader for cards equipped with computer chips, among other things.

According to embodiments, a merchant, as used herein, may refer to either a businessperson, business, or entity that trades in, sells, or offers commodities or services, produced by the merchant or by others. The merchant may sell goods or services in small or large quantities and may sell to few or many customers.

FIG. 1 depicts a system 100 for push payment authentication, according to various embodiments.

A payment association server 110 may be in communication with a mobile device 112 and a point-of-sale (POS) 116. The POS 116 may belong to a merchant, according to various embodiments. The POS 116 may also be either physical, electronic, and/or virtual, e.g., an Internet-based web page. The POS may also be in communication with the mobile device 112 through a user 114. The user 114 may facilitate communication between the POS 116 and the mobile device 112 by handling the mobile device 112, which may include scanning the mobile device and/or POS, or facilitating communication by various other means.

The payment association server 110 may also be connected to a network, such as the Internet 118, as depicted. Alternatively, the payment association server 110, mobile device 112, and the POS 116 may be connected by way of an internet, or other computing network 118.

According to various embodiments, communication between various components may occur in a certain "direction," or flow. Push authentication may refer to communication in a direction where the POS 116 utilizes the user 114 to communicate with the mobile device 112. The mobile device 112 may then transmit data to a server of the payment association 110. The server of the payment association 110 may transmit data to the POS 116, including, but not limited to, an indication that a transaction has been authenticated, or the details of one or more transactions.

The direction of communication is not intended to be construed as strictly occurring in one direction, and may occur in multiple directions or between different components, according to various embodiments.

Figure 2:
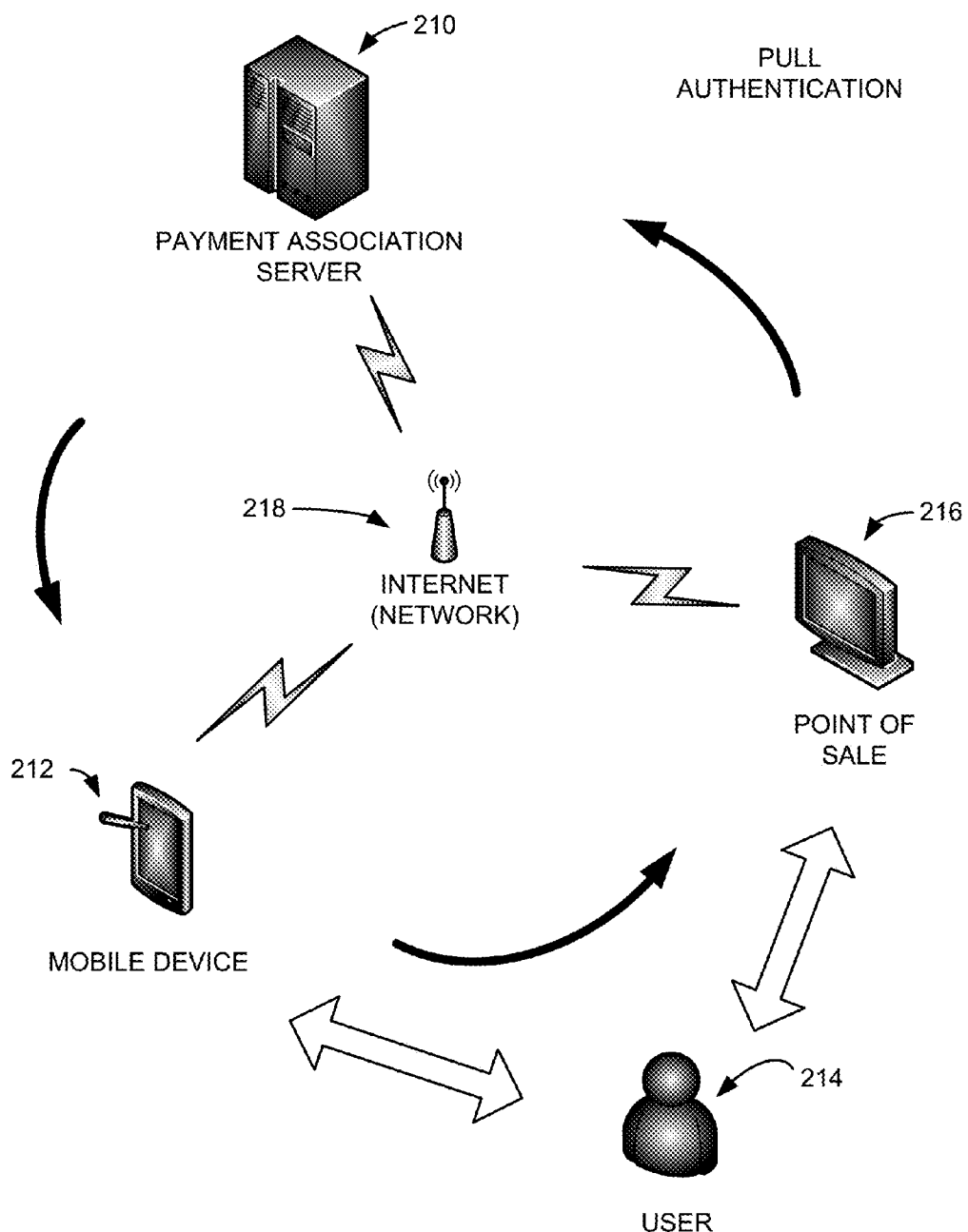
FIG. 2 depicts a system for pull payment authentication, according to various embodiments.

FIG. 2 depicts a system 200 for pull payment authentication, according to various embodiments.

A payment association server 210 may be in communication with a mobile device 212 and a point-of-sale (POS) 216. The POS 216 may belong to a merchant, according to various embodiments. The POS 216 may also be either physical or virtual, e.g., a web page. A virtual POS may include in-app purchases. An in-app purchase may include virtual-to-virtual apps, webpage-to-webpage, or device-to-device schemes. Webpage-to-webpage may include cross-platform use of hypertext markup language (HTML). According to various embodiments, device-to-device may include a mobile device 212 equipped with a card reader to facilitate a transaction. The POS may also be in communication with the mobile device 212 through a user 214. The user 214 may facilitate communication between the POS 216 and the mobile device 212 by handling the mobile device 212, which may include scanning the mobile device and/or POS, or facilitating communication by various other methods. Various methods of communication may include wireless data transfer using a radio frequency (RF). Examples of wireless data transfer may include radio-frequency identification (RFID), wireless fidelity (Wi-Fi), near-field communication (NFC), among others.

The payment association server 210 may also be connected to a network, such as the Internet 218, as depicted, according to various embodiments. Alternatively, the server of the payment association 210, mobile device 212, and the POS 216 may be connected by way of any of various types of networks or internets, such as the Internet 218, as described herein.

According to various embodiments, communication between various components may occur in a certain "direction," or flow, as described herein. Pull authentication may refer to communication in a direction where the mobile device 212 utilizes the user 214 to communicate with the POS 216. The POS 216 may then transmit data to the payment association server 210. The payment association server 210 may transmit data to the mobile device 212. The payment association server 210 may transmit data to the POS 216, including, but not limited to, an indication that a transaction has been authenticated.

The direction of communication is not intended to be construed as strictly occurring in one direction, and may occur in multiple directions or between different components, according to various embodiments.

Figure 3:
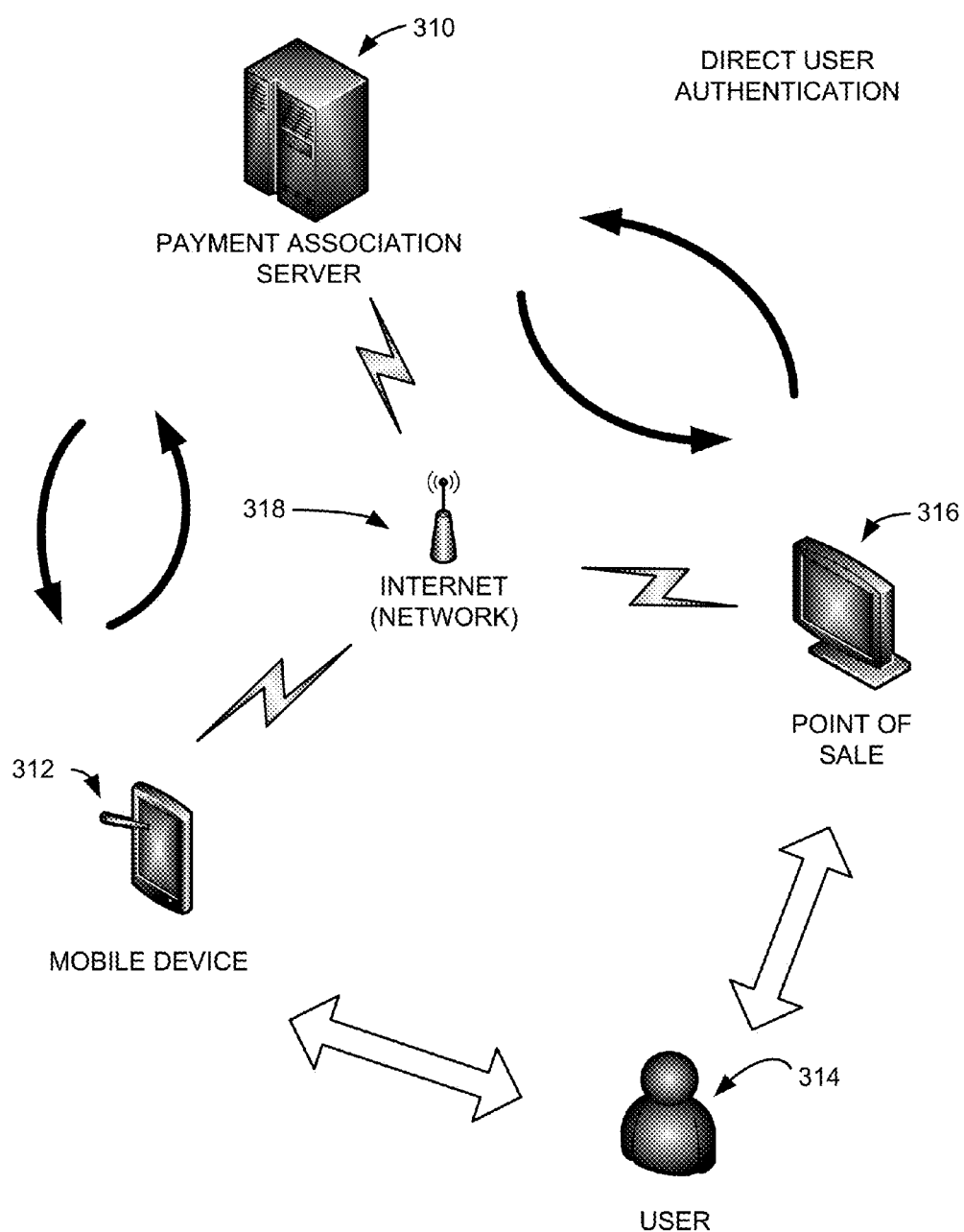
FIG. 3 depicts a system for payment authentication, according to various embodiments.

FIG. 3 depicts a system 300 for payment authentication, according to various embodiments.

A payment association server 310 may be in communication with a mobile device 312 and a point-of-sale (POS) 316. The POS 316 may belong to a merchant, according to various embodiments. The POS 316 may also be either physical, e.g., a POS equipped LCD touchscreen and/or physical buttons, or virtual, e.g., a web page. A user 314 may be in communication with the POS 316 and the mobile device 312. The payment association server 310, mobile device 312, and the POS 316 may communicate with one another through a network, such as the Internet 318. Communication between various actors through the Internet 318 may also be accomplished through a cloud network, or other network.

According to various embodiments, the payment association server 310 and the mobile device 312 may be in communication, both transmitting to and receiving from each other. Likewise, the payment association server 310 and the POS 316 may be in communication, both transmitting to and receiving from each other. The user 314 may be in communication with the mobile device 312, both transmitting and receiving and the user 314 may also be in communication with the POS 316, both transmitting and receiving.

According to various embodiments, the user 314 may desire to make a purchase, where the user would authorize a transfer of payment from a payment account of the user 314 to a merchant at the POS 316. The POS 316 may receive the indication of the desired purchase, of the user 314 from the merchant, and may transmit the details of the desired purchase to the server of the payment association 310. The server of the payment association 310, after receiving the details of the desired purchase, may relay, by transmitting, the details of the desired purchase to the mobile device of the user 312, and requesting affirmative confirmation before proceeding. If the user 314 signals to the mobile device 312, such as by pressing a physical or virtual touch screen button, or uttering a voice or other audible command, or various other methods, the mobile device 312, may transmit the indication to the payment association server 310. The user may communicate with the mobile device through an application loaded on the mobile device. The mobile device 312 may receive an indication from the user 314, or may interpret data otherwise received from the user 314. Upon receiving the transmission affirming validity of the transfer of funds from the user 314 to the merchant, the payment association server 310 may authorize the release of funds and transfer the funds to the merchant. The POS 316 may then receive a transmission from the payment association server 310 indicating that the transaction has been authorized. The merchant, through the POS or otherwise, may then receive indication that the transaction has been validated, or that the funds have been transferred. The merchant may then transfer the goods to the user.

Figure 4:
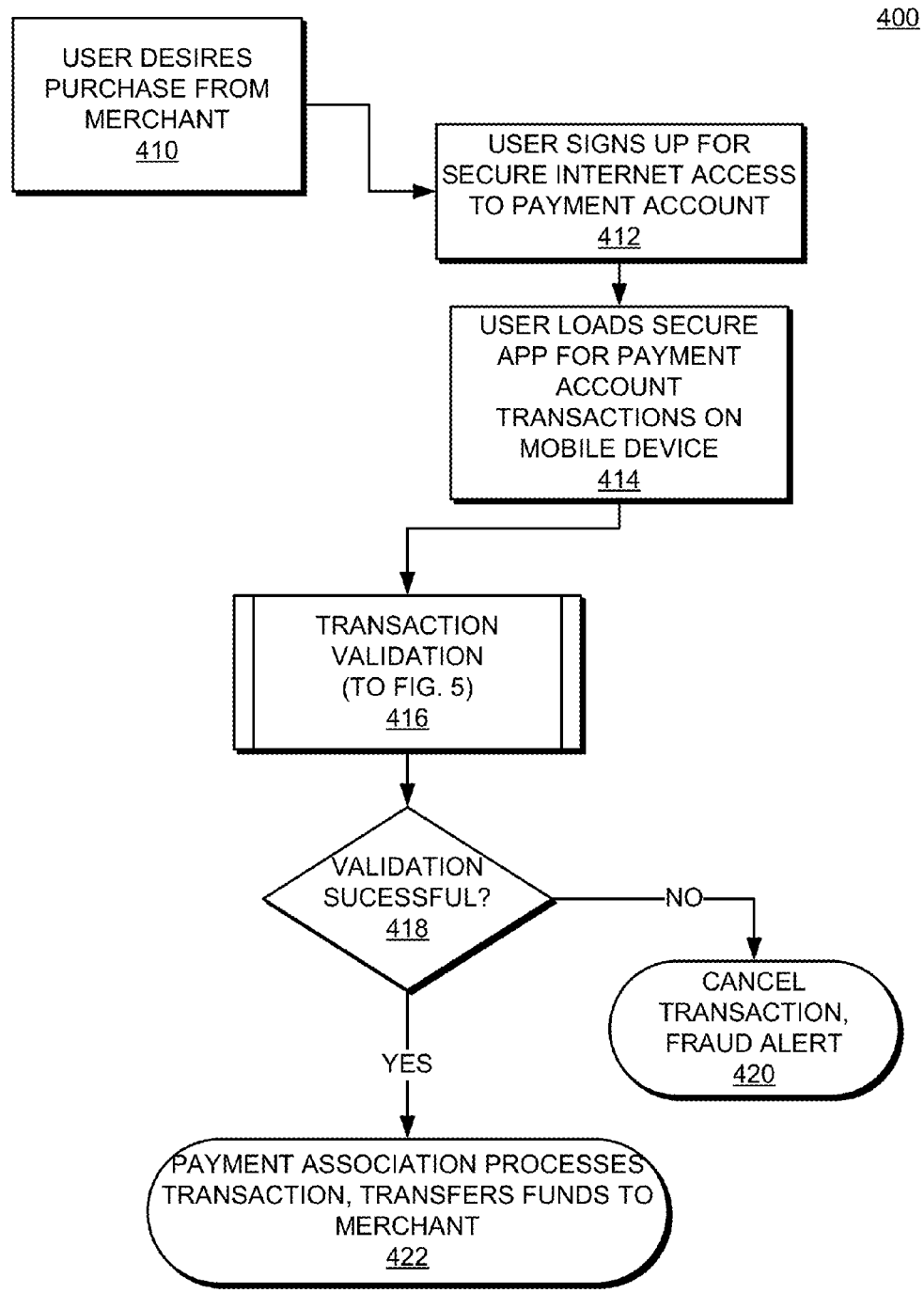
FIG. 4 depicts a flowchart of a method for payment authentication, according to various embodiments.

FIG. 4 depicts a flowchart of a method 400 for payment authentication, according to various embodiments.

According to various embodiments, a user may desire to purchase goods and/or services from a merchant 410. Accordingly, the user may sign up for secure internet access to a payment account 412. A user may then load a secure application for payment account transactions on a mobile device 414. The user's desired transaction may then be validated 416, according to various embodiments. It may then be determined if the validation was successful 418. If the validation was successful, the payment may be authorized and a payment association associated with the payment account of the user may process the transaction and transfer the user's funds to the merchant 422. If the validation is determined to not have been successful 418, then the transaction is not authenticated and may be canceled 420. If the transaction is canceled accordingly at operation 420, then a fraud alert may be issued, indicated, and/or transmitted, according to various embodiments.

Figure 5:
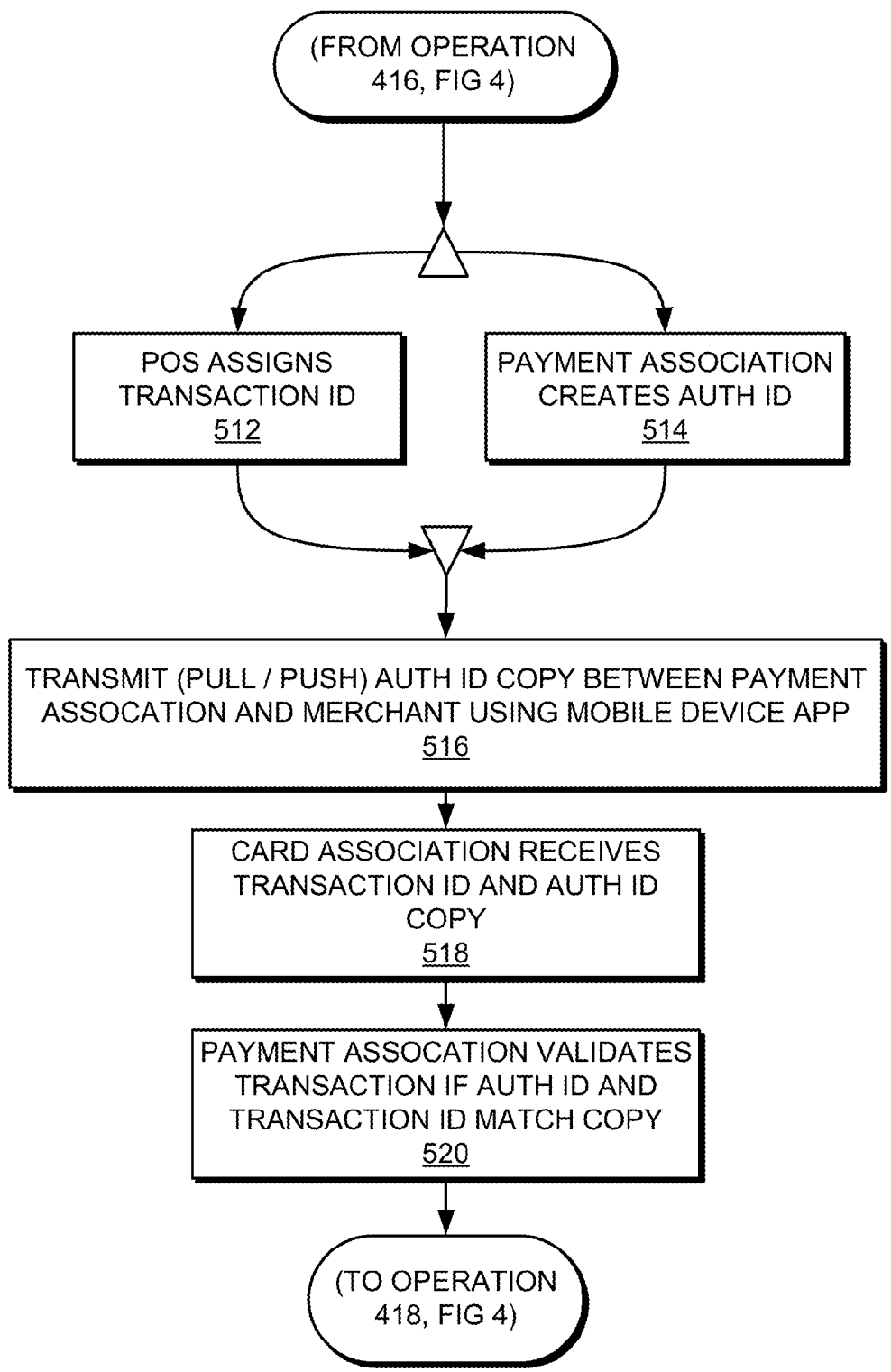
FIG. 5 depicts a flowchart of a method for payment authentication, according to various embodiments.

FIG. 5 depicts a flowchart of a method 500 for payment authentication, according to various embodiments.

The method 500 for payment authentication may correspond to operation 416 of FIG. 4, among others, according to various embodiments. A POS may assign a transaction identifier (transaction ID) to a potential purchase from a merchant 512. Additionally, and in parallel to operation 512, a payment association associated with a payment account of a user may create an authentication identifier (authentication ID) for a particular transaction assigned a transaction ID 514, which may be randomized. When the POS has assigned the transaction ID 512 and the payment association has created an authentication ID, a copy of the authentication ID may be transmitted between the payment association and the merchant using a mobile device, and a mobile device application 516, according to various embodiments. The card association may then receive both the transaction ID and a copy of the authorization ID 518. The payment association may then validate the transaction if the authentication ID and associated transaction ID match the copy of the authentication ID for the same transaction ID 520. Following operation 520, the method may continue to operation 418 of FIG. 4, according to various embodiments.

Figure 6:
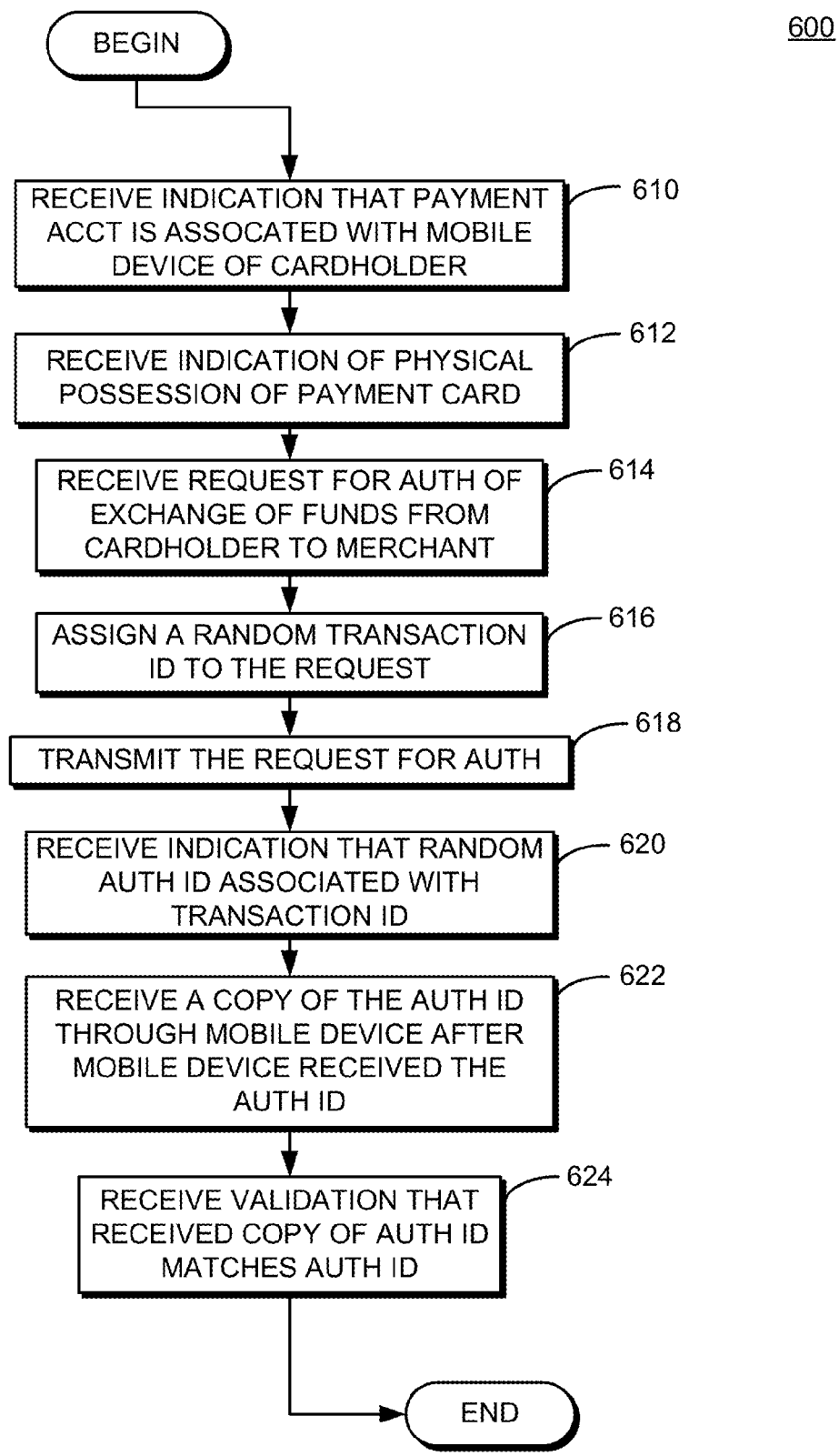
FIG. 6 depicts a flowchart of a method for payment authentication, according to various embodiments.

FIG. 6 depicts a flowchart of a method 600 for payment authentication, according to various embodiments.

According to various embodiments, a process may begin, where an indication may be received, indicating that a payment account of a cardholder (i.e., a user) is associated with a mobile device of a cardholder 610. The cardholder 610 may be the same or similar to user 114, 214, or 314, according to various embodiments. The mobile device may include a mobile device application, where the mobile device application is configured to communicate with a payment association and a payment account of the cardholder, according to various embodiments. The mobile device, as described herein, may be the same or similar to 112, 212, 312, or 910, according to various embodiments. The payment association may be the same or similar payment association that maintains the payment association server 110, 210, or 310, according to various embodiments.

According to various embodiments, the mobile device may be locked with a unique password known by the cardholder. The password may be a secret password known by the cardholder. The cardholder may create the password, or receive the password, according to various embodiments. The mobile device may also be locked to a biometric scan or other biometric qualities of the cardholder, according to various embodiments.

According to various embodiments, operation 610 may include receiving, by a point-of-sale (POS) terminal, an indication that a payment account of a cardholder is associated with a mobile device of the cardholder. According to various embodiments, the POS terminal may be a physical POS terminal, an electronic POS (EPOS) terminal, or a computer-based, virtual POS terminal, among other types of points-of-sale. The POS may be the same or similar to 116, 216, or 316, according to various embodiments.

An indication of physical possession of a payment card may also be received 612. According to various embodiments, operation 612 may include receiving, by the POS terminal, an indication of physical possession of a payment card by a merchant. According to various embodiments, receiving an indication of physical possession of a payment card may include reading the payment card held by the user by swiping a magnetic stripe on the payment card, or reading a computer chip embedded in the payment card, and receiving a personal identification number (PIN) corresponding to the payment card. The user may also hand the physical payment card to a clerk of a merchant, and the clerk may swipe the payment card or enter the numbers of the payment card into a POS or other merchant hardware, according to various embodiments. Alternatively, an indication of physical possession of the payment card may be received where the payment card is not tangible to the POS terminal, and possession is instead inferred through the cardholder entering a unique payment card number, CVV, expiration date, name printed on card, or any other information that may be found on the physical payment card.

A request for authentication of an exchange of funds from the payment account of a cardholder to a merchant may then be received 614. According to various embodiments, operation 614 may include receiving, by the POS terminal, a purchase request for an authorization of an exchange of funds from the payment account of the cardholder to the merchant.

A random transaction ID may then be assigned to the request for authentication 616. According to various embodiments, operation 616 may include assigning, by the POS terminal, a randomized transaction ID to the request for the authorization of the exchange of funds from the payment account of the cardholder to the merchant.

The request for authentication may then be transmitted 618. According to various embodiments, operation 618 may include transmitting, by the POS terminal, the request for the authorization of an exchange of funds from the payment account of the cardholder to the merchant and the assigned randomized transaction ID.

A randomized authentication ID associated with the random transaction ID may then be received 620. According to various embodiments, operation 620 may include receiving by the POS terminal, a randomized authentication ID associated with the assigned randomized transaction ID, from a payment association, the payment association determining whether the request for the authorization of the exchange of funds is valid.

A copy of the authentication ID may then be received through the mobile device, facilitated by a cardholder, after the mobile device received the authentication ID 622. According to various embodiments, operation 622 may include receiving, by the POS terminal, a copy of the randomized authentication ID through the mobile device, facilitated by a cardholder, where the mobile device receives the randomized authentication ID from the payment association.

According to various embodiments, the randomized authentication ID may be received through the mobile device, facilitated by a cardholder, by reading a one or two-dimensional barcode. According to various embodiments, the randomized authentication ID may also be received by a wireless transmission, or received visually or aurally.

Validation that the received copy of the authentication ID matches the randomized authentication ID may be received 624 and the process may end. According to various embodiments, operation 624 may include receiving, by the POS terminal, validation that the received copy of the randomized authentication ID matches the randomized authentication ID. Various embodiments may include completing a transaction in response to validation that the received copy of the randomized authentication ID matches the randomized authentication ID.

According to various embodiments, a payment association computing device may perform various operations. The operations performed by the payment association computing device may correspond to various operations 610-624, according to various embodiments, but performed by the payment association computing device in place of the POS terminal, although various other combinations not listed are also contemplated. Further, operations equivalent to 610-624 and variations thereof are contemplated as performed by various other machines, devices, computers, etc.

According to various embodiments, the payment association computing device may receive an indication that a payment account of a cardholder is associated with a mobile device of the cardholder. According to various embodiments, the payment association computing device may further receive indication of physical possession of a payment card by a merchant at a point-of-sale (POS) terminal. According to various embodiments, the payment association computing device may further receive a purchase request for an authorization of an exchange of funds from the payment account of the cardholder to the merchant at the POS terminal.

According to various embodiments, the payment association computing device may further transmit an assigned randomized transaction ID and a randomized authentication ID to the POS terminal, where the assigned randomized transaction ID and the randomized authentication ID are used to determine whether the request for the authorization of the exchange of funds is valid. The randomized transaction ID may be randomized during, before, or after an assignment process. Additionally, the randomized authentication ID may be randomized during, before, or after an assignment process. The randomization and assignment for the transaction ID and/or authentication ID may utilize a representation including number of alphanumeric characters, among other forms, and may be stored in various memory or other computer-based storage, according to various embodiments. According to various embodiments, the payment association computing device may further transmit, to the POS terminal, a copy of the authentication ID through the mobile device, facilitated by a cardholder, where the mobile device receives the authentication ID from the payment association. According to various embodiments, the payment association computing device may further transmit, to the POS terminal, validation that the received copy of the authentication ID matches the authentication ID.

Figure 7:
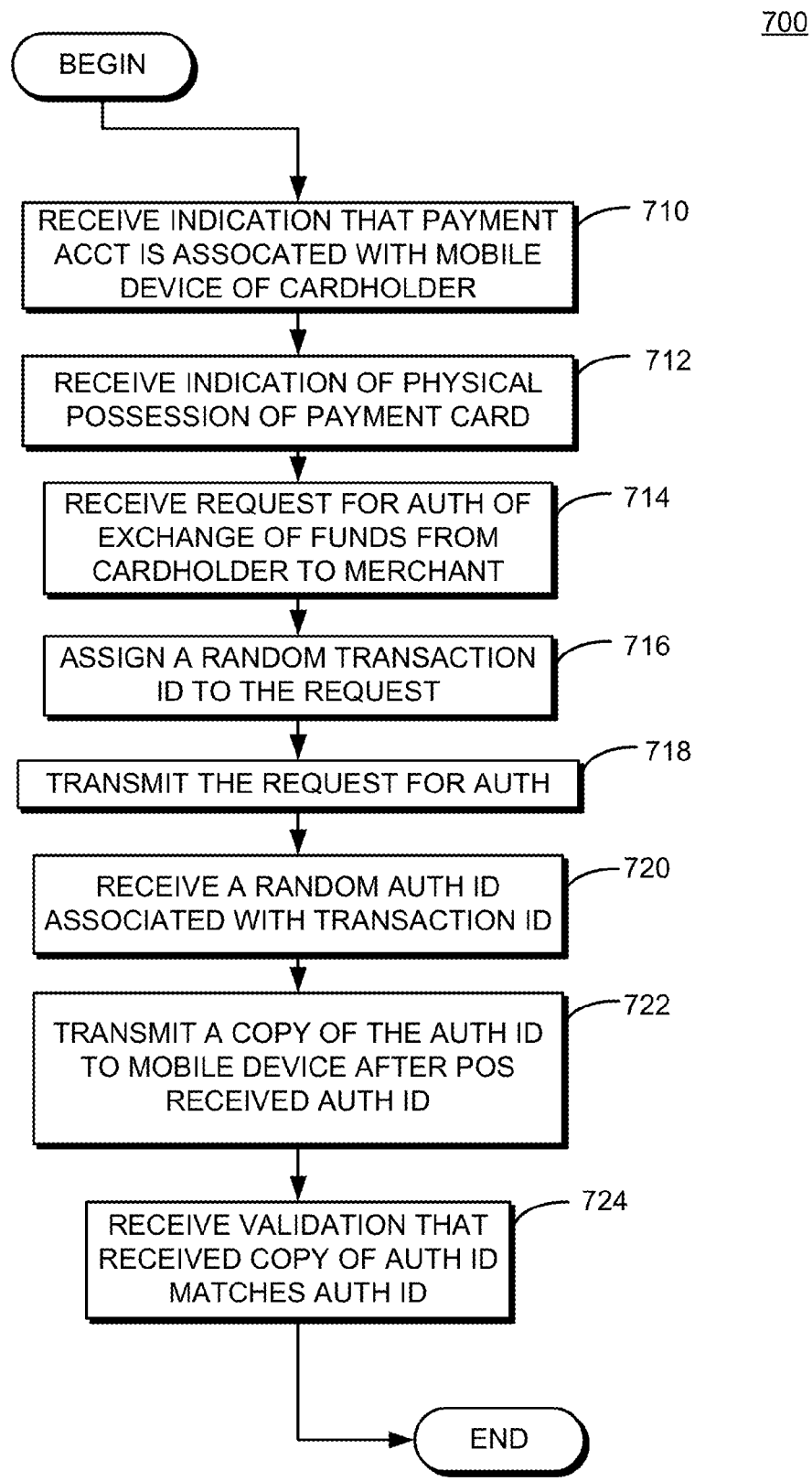
FIG. 7 depicts a flowchart of a method for payment authentication, according to various embodiments.

FIG. 7 depicts a flowchart of a method 700 for payment authentication, according to various embodiments.

According to various embodiments, a process may begin, where an indication may be received, indicating that a payment account of a cardholder (i.e., a user) is associated with a mobile device of a cardholder 710. The cardholder 710 may be the same or similar to user 114, 214, or 314, according to various embodiments. The mobile device may include a mobile device application, where the mobile device application is configured to communicate with a payment association and a payment account of the cardholder, according to various embodiments. The mobile device, as described herein, may be the same or similar to 112, 212, 312, or 910, according to various embodiments. The payment association may be the same or similar payment association that maintains the payment association server 110, 210, or 310, according to various embodiments.

According to various embodiments, operation 710 may include receiving, by a point-of-sale (POS) terminal, an indication that a payment account of a cardholder is associated with a mobile device of the cardholder. According to various embodiments, the POS terminal may be a physical POS terminal, an electronic POS (EPOS) terminal, or a computer-based POS terminal, among other types of points-of-sale. The POS may be the same or similar to 116, 216, or 316, according to various embodiments.

According to various embodiments, the mobile device may be locked with a unique password known by the cardholder. The mobile device may also be locked to a biometric scan of the cardholder, according to various embodiments.

An indication of physical possession of a payment card may also be received 712. According to various embodiments, operation 712 may include receiving, by the POS terminal, an indication of physical possession of a payment card by a merchant. According to various embodiments, receiving an indication of physical possession of a payment card may include reading the payment card held by the user by swiping a magnetic stripe on the payment card, or reading a computer chip embedded in the payment card, and receiving a personal identification number (PIN) corresponding to the payment card. The user may also hand the physical payment card to a clerk of a merchant, and the clerk may swipe the payment card or enter the numbers of the payment card into a POS or other merchant hardware, according to various embodiments. Alternatively, an indication of physical possession of the payment card may be received where the payment card is not tangible to the POS terminal, and possession is instead inferred through the cardholder entering a unique payment card number, CVV, expiration date, name printed on card, or any other information that may be found on the physical payment card.

A request for authentication of an exchange of funds from the payment account of a cardholder to a merchant may then be received 714. According to various embodiments, operation 714 may include receiving, by the POS terminal, a purchase request for an authorization of an exchange of funds from the payment account of the cardholder to the merchant.

A random transaction ID may then be assigned to the request for authentication 716. According to various embodiments, operation 716 may include assigning, by the POS terminal, a randomized transaction ID to the request for the authorization of the exchange of funds from the payment account of the cardholder to the merchant.

The request for authentication may then be transmitted 718. According to various embodiments, operation 718 may include transmitting, by the POS terminal, the request for the authorization of an exchange of funds from the payment account of the cardholder to the merchant and the assigned randomized transaction ID.

A randomized authentication ID associated with the randomized transaction ID may then be received 720. According to various embodiments, operation 720 may include receiving by the POS terminal, a randomized authentication ID associated with the assigned randomized transaction ID, from a payment association, the payment association determining whether the request for the authorization of the exchange of funds is valid.

A copy of the authentication ID may then be transmitted to the mobile device, facilitated by a cardholder, after the POS received the authentication ID 722. According to various embodiments, operation 722 may include transmitting, by the POS terminal, a copy of the randomized authentication ID to the mobile device, facilitated by a cardholder, where the POS terminal receives the randomized authentication ID from the payment association 722.

According to various embodiments, the randomized authentication ID may be received through the POS terminal, by reading a one or two-dimensional barcode. According to various embodiments, the randomized authentication ID may also be received by a wireless transmission, or received visually or aurally. The randomized authentication ID, if received by visual wireless transmission through the POS terminal, may be received through visual signals, codes, texts, symbols, light flashes, etc. The visual transmission may include transmissions through light (i.e., electromagnetic radiation) in the human-visible regions of the electromagnetic spectrum, but may also include transmissions above or below what is visible to a human. The randomized authentication ID, if received by aural wireless transmission through the POS terminal, may be received through aural sounds, signals, etc., whether in the audible-to-human spectrum, above, or below. In other words, sounds may be transmitted that are not typically audible to a human.

Validation that the received copy of the authentication ID matches the randomized authentication ID may be received 724 and the process may end. According to various embodiments, operation 724 may include receiving, by the POS terminal, validation that the received copy of the randomized authentication ID matches the randomized authentication ID.

Various embodiments may include completing a transaction in response to validation that the received copy of the randomized authentication ID matches the randomized authentication ID.

According to various embodiments, a payment association computing device may perform various operations. The operations performed by the payment association computing device may correspond to various operations 710-724, according to various embodiments, but performed by the payment association computing device in place of the POS terminal, although various other combinations not listed are also contemplated. Further, operations equivalent to 710-724 and variations thereof are contemplated as performed by various other machines, devices, computers, etc.

According to various embodiments, the payment association computing device may receive an indication that a payment account of a cardholder is associated with a mobile device of the cardholder. According to various embodiments, the payment association computing device may further receive an indication of physical possession of a payment card by a merchant at a point-of-sale (POS) terminal. According to various embodiments, the payment association computing device may further receive a purchase request for an authorization of an exchange of funds from the payment account of the cardholder to the merchant at a POS terminal.

According to various embodiments, the payment association computing device may further receive a randomized transaction ID to the request for the authorization of the exchange of funds. According to various embodiments, the payment association computing device may further receive, by the POS terminal, a request for an authorization of the exchange of funds from the payment account of the cardholder to the merchant. According to various embodiments, the payment association computing device may further transmit to the POS terminal, the randomized transaction ID and a randomized authentication ID associated with the transaction ID, where the transaction ID and the randomized authentication ID are used to determine whether the request for the authorization of the exchange of funds is valid.

According to various embodiments, the payment association computing device may further transmit, through the POS terminal, a copy of the authentication ID to the mobile device. According to various embodiments, the payment association computing device may further transmit, to the POS terminal, validation that the transmitted copy of the authentication ID from the mobile device matches the authentication ID.

Figure 8:
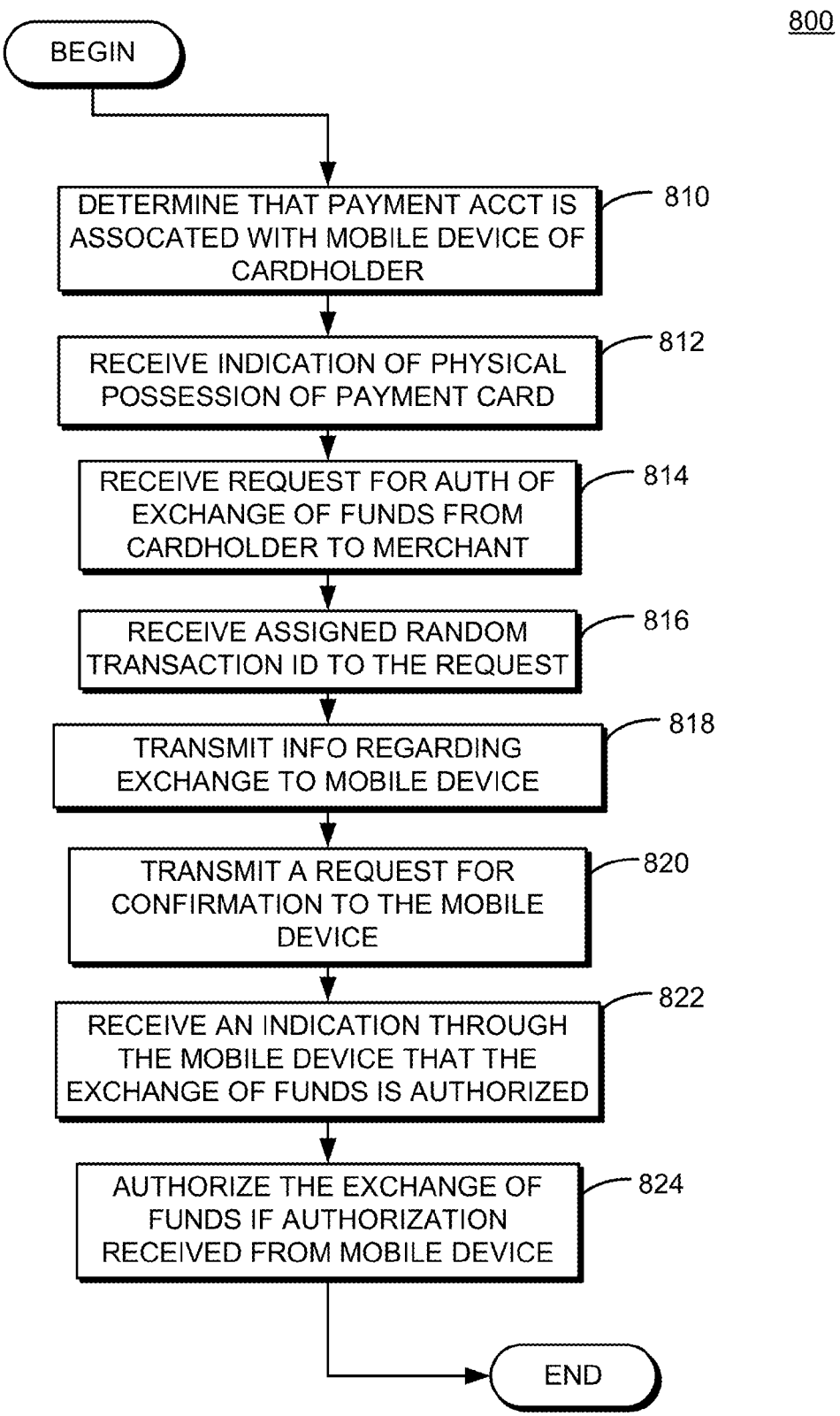
FIG. 8 depicts a flowchart of a method for payment authentication, according to various embodiments.

FIG. 8 depicts a flowchart 800 of a method for payment authentication, according to various embodiments.

According to various embodiments, a process may begin, where it may be determined that a payment account is associated with a mobile device of a cardholder (i.e., a user) 810. The cardholder 810 may be the same or similar to user 114, 214, or 314, according to various embodiments. According to various embodiments, operation 810 may include determining, by a payment association computing device, that a payment account of a cardholder is associated with a mobile device of the cardholder. According to various embodiments, the payment association computing device may be a server. The mobile device may include a mobile device application, where the mobile device application is configured to communicate with a payment association and a payment account of the cardholder, according to various embodiments. The mobile device, as described herein, may be the same or similar to 112, 212, 312, or 910, according to various embodiments. The payment association computing device may be the same or similar to the payment association server 110, 210, or 310, according to various embodiments.

According to various embodiments, the mobile device may be locked with a unique password known by the cardholder, as described herein. The mobile device may also be locked to a biometric scan of the cardholder, as described herein, according to various embodiments.

An indication of physical possession of a payment card may also be received 812. According to various embodiments, operation 812 may include receiving, by the payment association computing device, an indication of physical possession of a payment card by a merchant. According to various embodiments, receiving an indication of physical possession of a payment card may include reading the payment card held by the user by swiping a magnetic stripe on the payment card, or reading a computer chip embedded in the payment card, and receiving a personal identification number (PIN) corresponding to the payment card. The user may also hand the physical payment card to a clerk of a merchant, and the clerk may swipe the payment card or enter the numbers of the payment card into a POS or other merchant hardware, according to various embodiments. Alternatively, an indication of physical possession of the payment card may be received where the payment card is not tangible to the POS terminal, and possession is instead inferred through the cardholder entering a unique payment card number, CVV, expiration date, name printed on card, or any other information that may be found on the physical payment card.

According to various embodiments, receiving an indication of physical possession of a payment card may be performed by the POS terminal. According to various embodiments, the POS terminal may be a physical POS terminal, an electronic POS (EPOS) terminal, or a computer-based POS terminal, among other types of points-of-sale. The POS may be the same or similar to 116, 216, or 316, according to various embodiments.

A request for authentication of an exchange of funds from the payment account of a cardholder to a merchant may then be received 814. According to various embodiments, operation 814 may include receiving, by the payment association computing device, a purchase request for an authorization of an exchange of funds from the payment account of the cardholder to the merchant. According to various embodiments, the request for the exchange of funds may represent a purchase.

An assigned randomized transaction ID to the request may then be received 816. According to various embodiments, operation 816 may include receiving, by the payment association computing device, an assigned randomized transaction ID to the request for the authorization of the exchange of funds. Information regarding the exchange may then be transmitted to the mobile device 818. According to various embodiments, operation 818 may include transmitting, by the payment association computing device, to the mobile device, information regarding the exchange of funds assigned the randomized transaction ID.

A request for confirmation may then be transmitted to the mobile device 820, according to various embodiments. According to various embodiments, operation 820 may include transmitting, by the payment association computing device, to the mobile device, a request for confirmation. The transmitting of the request for confirmation may be transmitted to the mobile device in response to transmitting the information regarding the exchange of funds, of the authorization from the cardholder from the payment account of the cardholder to the merchant.

An indication may then be received through the mobile device, facilitated by a cardholder, indicating that the exchange of funds is authorized 822. According to various embodiments, operation 822 may include receiving, by the payment association computing device, an indication, through the mobile device. The indication received through the mobile device may be received in response to transmitting the request for confirmation, that the exchange of funds assigned the randomized transaction ID from the payment account of the cardholder to the merchant is authorized. According to various embodiments, operation 822 may also include displaying the information regarding the exchange of funds that has been assigned the randomized transaction ID to the cardholder on the mobile device.

The exchange of funds may be authorized if authorization is received from the mobile device 824, and the process may end. According to various embodiments, operation 824 may include authorizing, by the payment association computing device, the exchange of funds assigned the randomized transaction ID from the payment account of the cardholder to the merchant. The exchange of funds assigned the randomized transaction ID may be authorized in response to the received indication that the cardholder authorizes the exchange of funds that has been assigned the randomized transaction ID from the payment account of the cardholder to the merchant.

Figure 9:
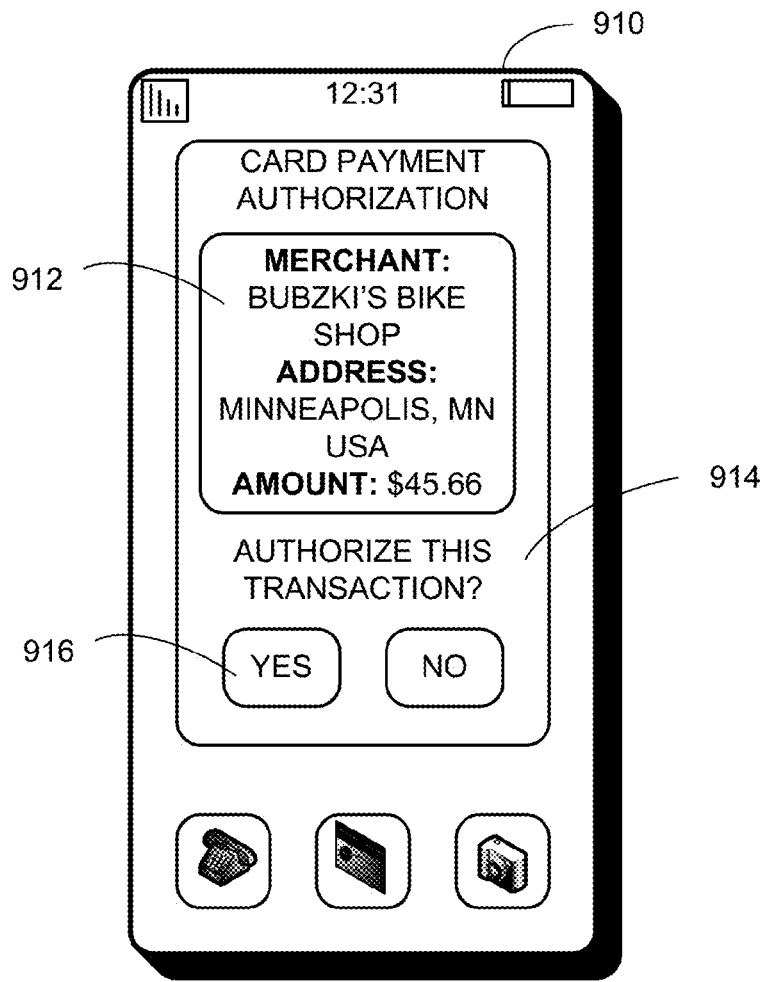
FIG. 9 depicts a graphical user interface of an application on a mobile device for payment authentication, according to various embodiments.

FIG. 9 depicts a graphical user interface 900 of an application on a mobile device for payment authentication, according to various embodiments.

Mobile device 910 may belong to a user, and the user may also be a cardholder with an associated payment account and payment card. According to various embodiments, the mobile device 910 may be a smartphone, or other form of telephone. The mobile device 910 may also be any other form of mobile device, including a laptop computer, tablet, personal digital assistant (PDA), head-mounted device, wearable device, etc. The mobile device, as described herein, may be the same or similar to 112, 212, or 312, according to various embodiments.

According to various embodiments, a cardholder may desire to make a purchase at a merchant. The cardholder may be a customer, according to various embodiments. The cardholder may have a mobile device 910, according to various embodiments. The cardholder may desire to purchase a bicycle tire from a bicycle shop (a merchant) that the cardholder has visited in person. The cardholder may initiate a purchase with the bicycle shop, and indicate a desire to pay for the bicycle tire using a credit card (a payment card). A clerk at the bicycle shop may indicate that there is a POS with which the cardholder may swipe his or her card to initiate a purchase, or a self-checkout POS may be utilized. Upon swiping or otherwise scanning the cardholder's payment card, the cardholder's mobile device 910 may receive a message containing a request for authorization 914. The request for authorization may also include various transaction data 912, including the name of the merchant, the address of the merchant, the amount of the merchant, etc. For example, in the embodiment shown, the merchant is listed as "Bubzki's Bike Shop," the address is listed as "Minneapolis, Minn.," and the amount is listed as "$45.66." The cardholder may study and confirm the transaction data 912, and the cardholder may indicate whether the transaction is authorized. The cardholder may indicate whether the transaction is authorized by utilizing a button or multiple buttons 916 located on a graphical user interface (GUI) of the mobile device. For example, the buttons 916 may include "Yes," "No," "Authorize," "Cancel," or various other indications that may be communicated to a payment server of a payment association, and may ultimately be transmitted to the POS at the merchant, determining whether the cardholder's payment will be accepted, as described herein.

Figure 10:
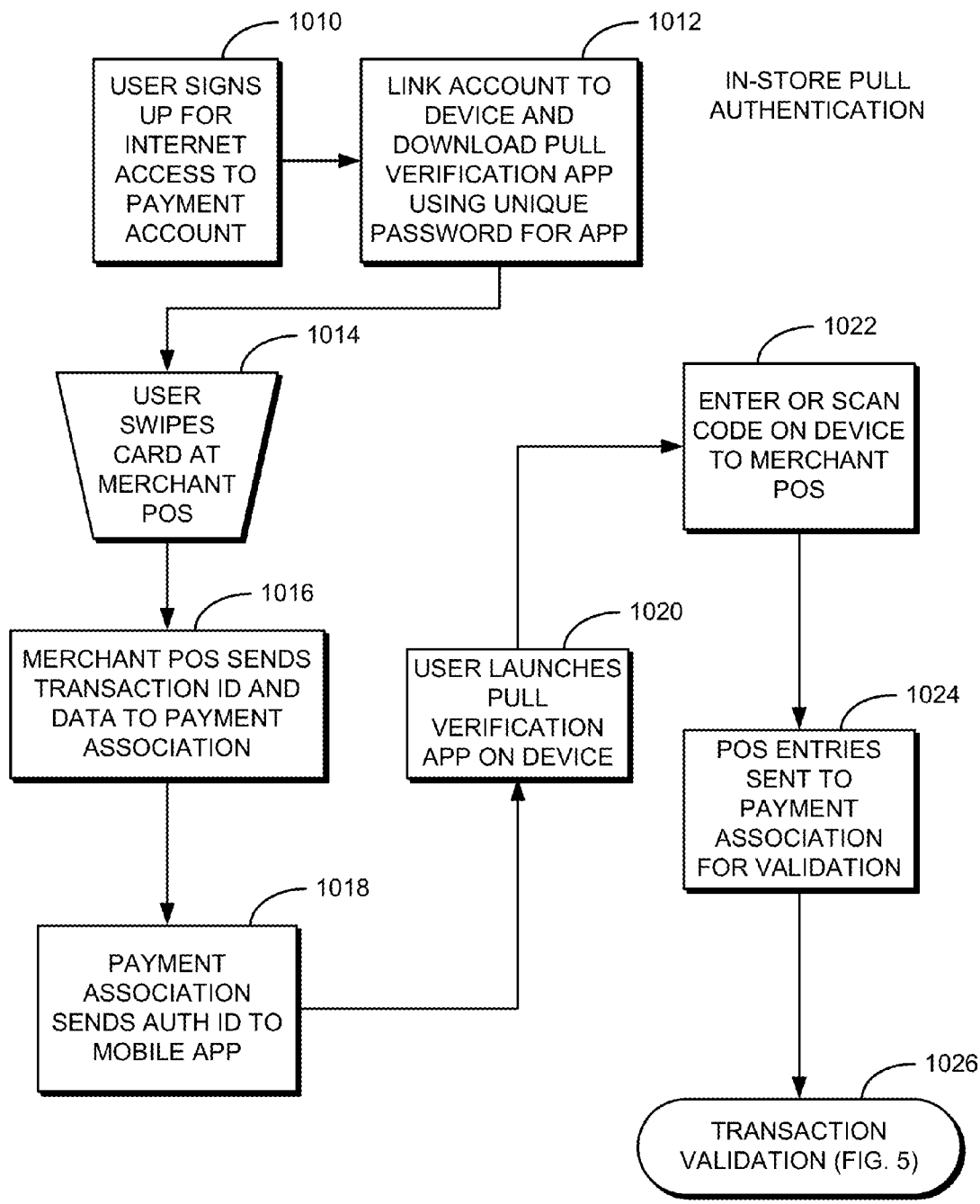
FIG. 10 depicts a flowchart of a method for in-store pull authentication, according to various embodiments.

FIG. 10 depicts a flowchart of a method 1000 for in-store pull authentication, according to various embodiments.

A user (or, a cardholder or a consumer) may sign up for Internet access to a payment account 1010. The payment account and payment card may then be linked to a mobile device and a pull verification mobile device application may be downloaded, using a unique password for the application 1012. The user may manually start a purchase by swiping or scanning the payment card at a merchant point-of-sale (POS) 1014.

The merchant POS may then send a transaction ID and verification request to an associated payment association of the card that was swiped 1016. The payment association may then send a unique authentication ID (ID) linked to the current transaction to the user's mobile application 1018. The authentication ID could be a variety of implementations including, but not limited to, a number, alphanumerics, or a one or two-dimensional barcode (such as a quick-reference "QR" code).

The user may then launch the pull verification application on the mobile device 1020. The user may then enter, scan or transmit the authentication ID into the merchant's POS hardware 1022. The entered ID may then be transmitted back to the payment association to validate the combination of the payment card data, transaction ID, and authentication ID 1024. The payment association may process the data and may return a transaction validation 1026 notification back to the merchant to complete the transaction. If any of the data (e.g., payment card number, transaction ID, or authentication ID) is not consistent, then the transaction may be rejected. Transaction validation 1026 may utilize a process similar to that described in FIG. 5, according to various embodiments.

Figure 11:
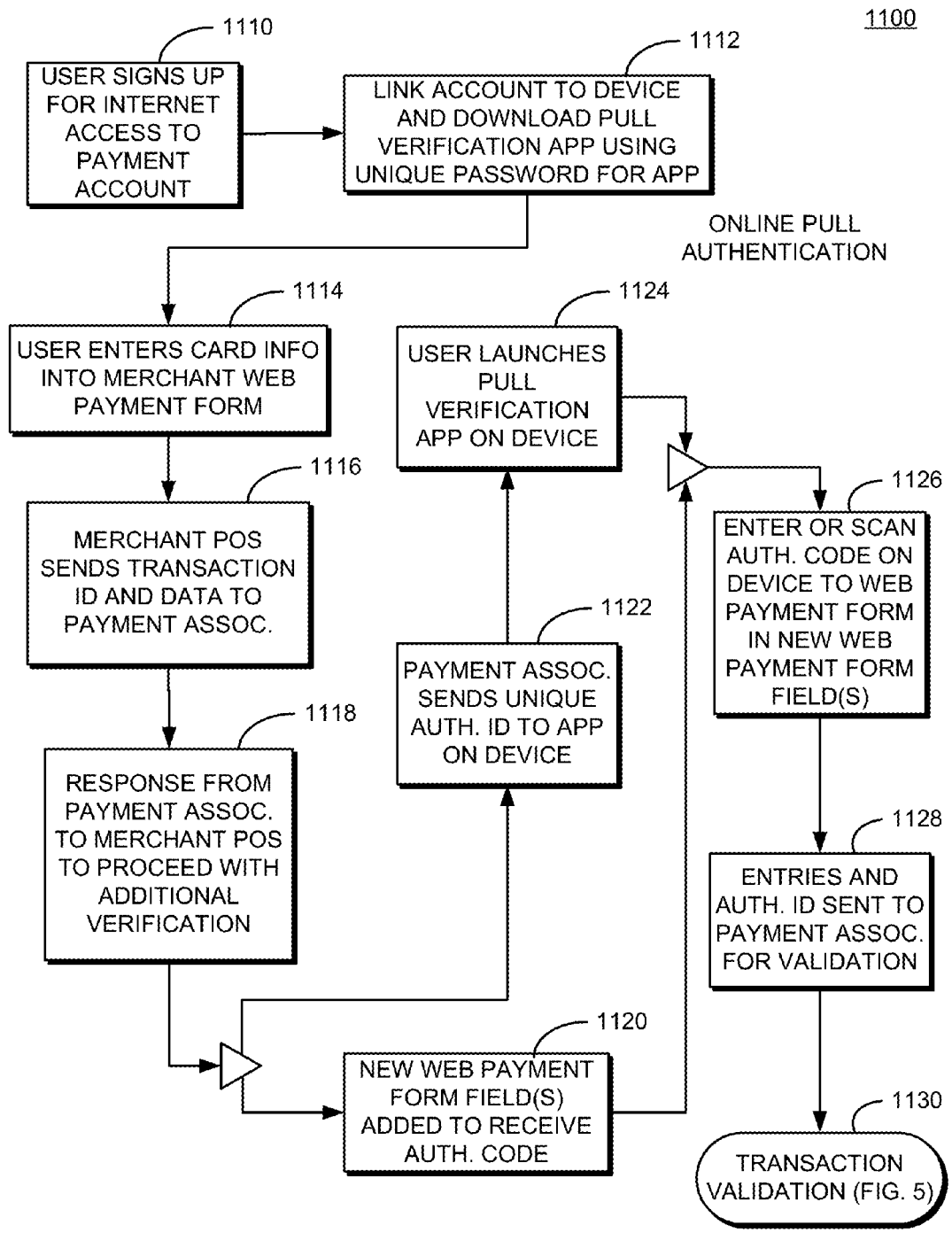
FIG. 11 depicts a flowchart of a method for online pull authentication, according to various embodiments.

FIG. 11 depicts a flowchart of a method 1100 for online pull authentication, according to various embodiments.

A user (or, a cardholder or a consumer) may sign up for Internet access to a payment account 1110. The payment account and payment card may then be linked to a mobile device and a pull verification mobile device application may be downloaded, using a unique password for the application 1112. The user may start a purchase by entering the card information of the payment card at a merchant web payment form 1114. The user may arrive at a "check-out" webpage and may accordingly fill in the required payment card information. The user may click "apply" for processing the transaction.

The merchant may then send the transaction ID and transaction data to the payment association for verification 1116. A response may be transmitted from the payment association to the merchant to proceed for additional verification 1118. The merchant may then add or present a new form or one or more supplemental fields on the current form to capture an authentication code from the user 1120.

In parallel the payment association may send a unique authentication ID linked to the current transaction to the user's mobile device and mobile device application 1122. The authentication ID could be a variety of implementations including but not limited to a number, alphanumerics, or a one- or two-dimensional barcode (e.g., a quick-reference (QR) code). The user may receive the sent unique authentication ID and then enter the unique authentication ID that could be a number/word/phrase (alphanumeric) into the supplemental authentication form field of the web payment form 1126. The user may then indicate, e.g., by clicking or tapping, "apply."

The entered ID may then be transmitted back to the payment association to validate the combination of the payment card data, transaction ID, and authentication ID 1128. The transaction may be validated, e.g., by the payment association 1130. The validation of the transaction may follow a similar flow as FIG. 5, among others. After the payment association has processed the data, the payment association may transmit a notification of transaction validation back to the merchant POS, allowing the user to complete the transaction. The payment association may utilize one or more servers and/or clients in order to complete various operations, including transaction validation.

During transaction validation, if any of the data is not consistent, payment card number, transaction ID, and authentication ID then the transaction may be rejected.

Figure 12:
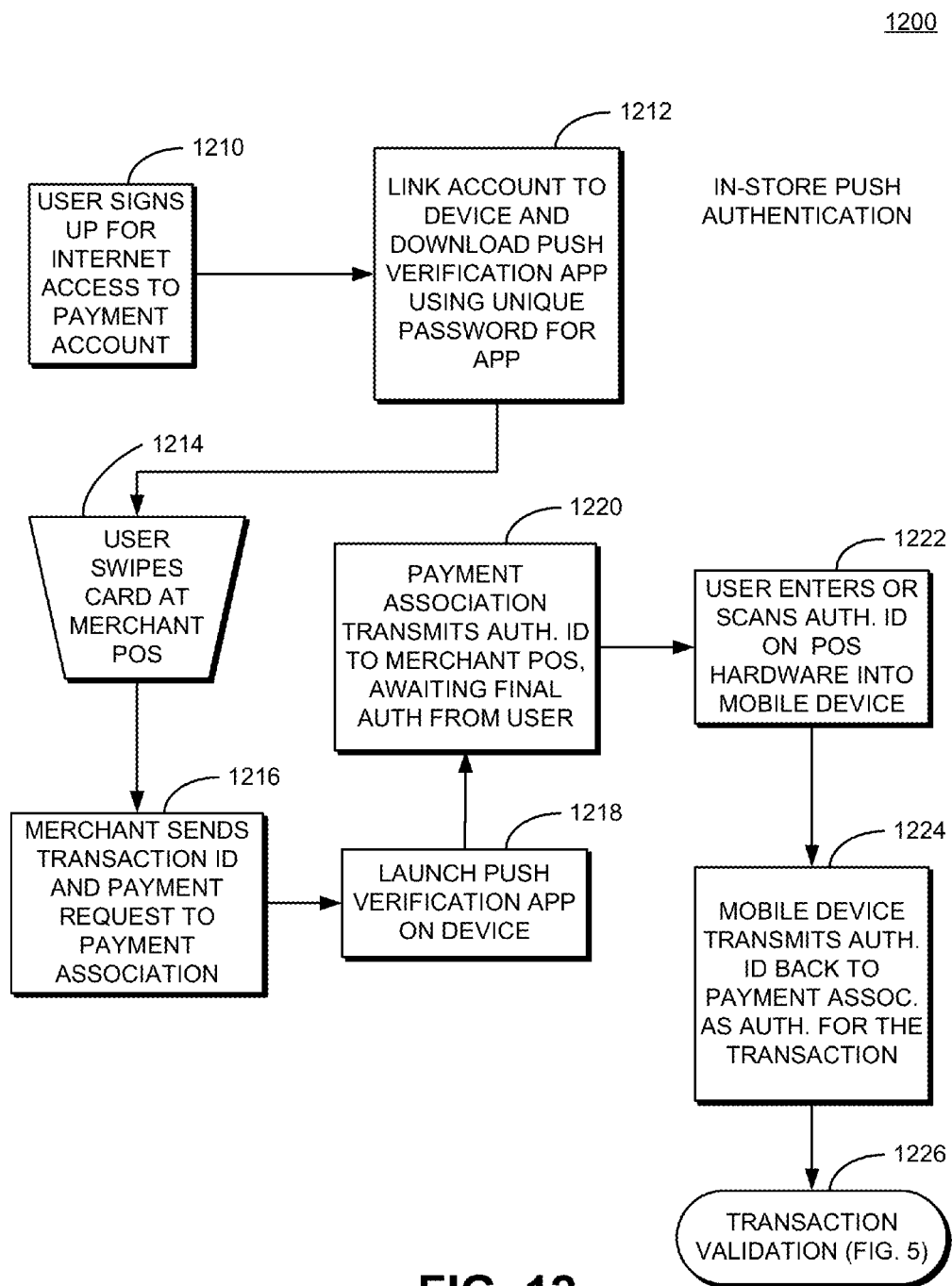
FIG. 12 depicts a flowchart of a method for in-store push authentication, according to various embodiments.

FIG. 12 depicts a flowchart of a method 1200 for in-store push authentication, according to various embodiments.

A user (or, a cardholder or a consumer) may sign up for Internet access to a payment account 1210. The payment account and payment card may then be linked to a mobile device and a push verification mobile device application may be downloaded, using a unique password for the application 1212. A purchase may be started by the user swiping a payment card at a merchant point-of-sale (POS) 1214. The merchant POS may then create and send a transaction identifier (ID) and a payment transaction request to the payment association of the card that was swiped 1216.

The user, having the mobile device, may then launch the push verification mobile device application, using the unique password for the application 1218, according to various embodiments. The payment association may alternatively assign and transmit a unique transaction ID to the merchant POS, instead of the payment association receiving an assigned transaction ID from the merchant POS. The transaction ID could be a variety of implementations including but not limited to a number, alphanumerics, or a one or two-dimensional barcode (e.g., a quick reference (QR) code). The payment association may assign an authentication ID to the transaction ID, and transmit the authentication ID to the merchant POS, which may await further or final authorization and action from the user 1220. The user may then enter, scan, or transmit the authentication ID into the mobile device application from the merchant's POS 1222.

The mobile device application may transmit the transaction ID and associated authentication ID, or a hashed variation thereof, back to the payment association as authentication for the transaction associated with the assigned transaction ID 1224. The transmission of the transaction ID and/or associated authentication ID may serve as authorization/acceptance of the current transaction during transaction validation 1226. The payment association may then signal the merchant that the transaction is accepted. If any of the data (e.g., payment card number, transaction ID, authentication ID, mobile response transaction or hashed transaction ID, or authentication ID) is not consistent, then the transaction may be rejected.

Figure 13:
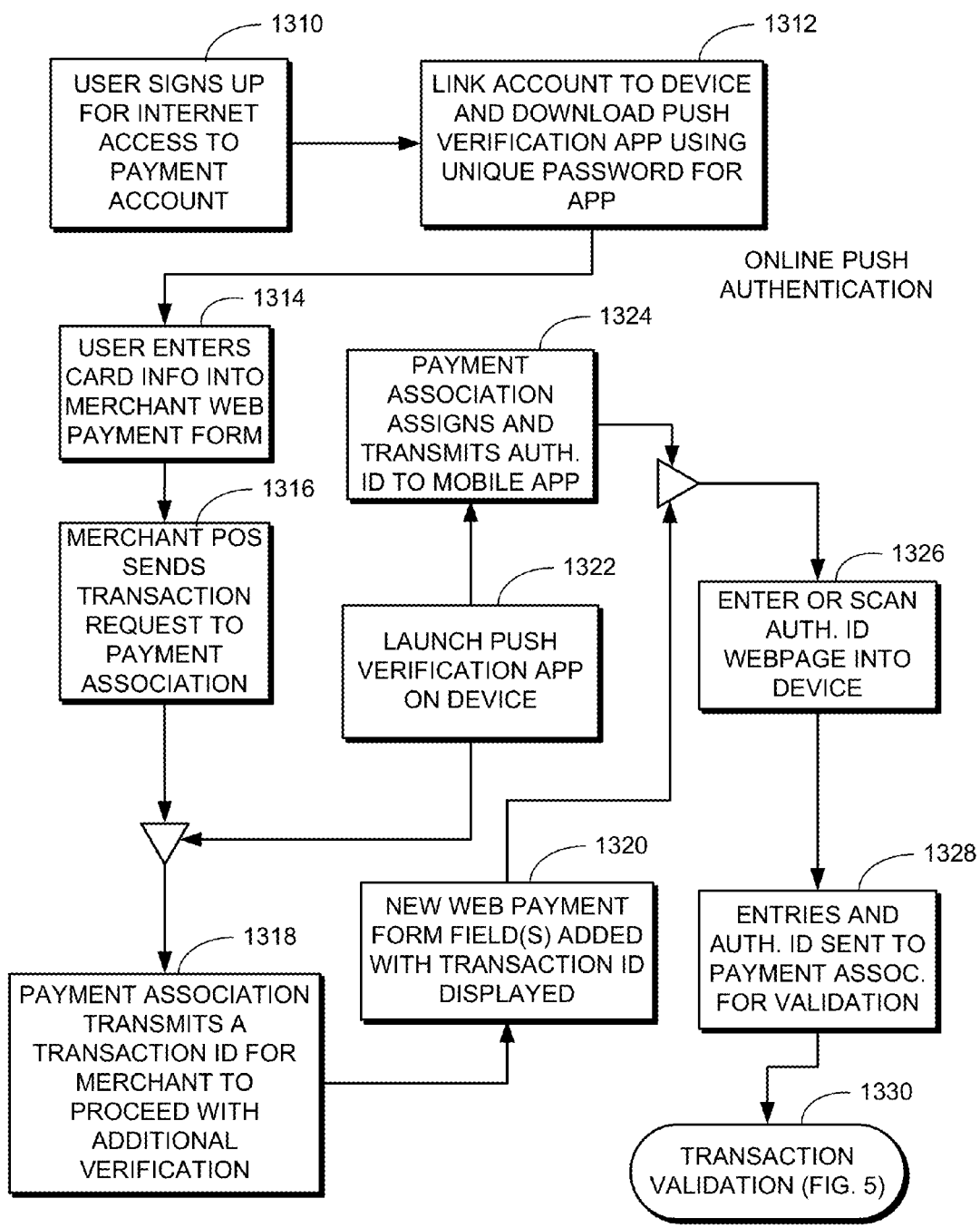
FIG. 13 depicts a flowchart of a method for online push authentication, according to various embodiments.

FIG. 13 depicts a flowchart of a method 1300 for online push authentication, according to various embodiments.

A user (or, a cardholder or a consumer) may begin by signing up for Internet access to a payment account 1310. The payment account and associated payment card may then be linked to a mobile device and a push verification mobile device application may be downloaded, using a unique password for the application 1312.

A user may desire to make a purchase online, and the user may arrive at a merchant web payment form, e.g., a "checkout" webpage, and the user may enter various required payment card information 1314. The user may then click "apply" for processing, or "submit order," according to various embodiments. The merchant POS may assign and then send a transaction ID and request to the payment association for a transfer of funds to complete the order of the user 1316.

The payment association may alternatively assign a transaction ID to the request from the merchant POS. The payment association, whether or not it assigned the transaction ID, may transmit the transaction ID to the merchant 1318, according to various embodiments. The merchant may displays a new form or supplemental fields with transaction ID displayed. The transaction ID could be a variety of implementations including but not limited to a number, alphanumerics, barcode, or QR code. One or more web payment form fields may then be added 1320. The transaction ID may be displayed, according to various embodiments. In parallel to operation 1318 and 1320, the user may launch the push verification application on the mobile device 1322. Additionally, the payment association may assign a randomized authentication ID and may transmit the randomized authentication ID to the mobile application on the mobile device of the user 1324.

From operation 1324 and/or 1320, according to various embodiments, the authentication ID and/or transaction ID may be entered or scanned from the displayed merchant webpage to the mobile device 1326. Using the mobile application the user may enter or scan the unique transaction ID displayed on the webpage. The mobile application may send the authentication ID, the transaction ID, or hashed version of the authentication ID or transaction ID back to the payment association for processing. The payment association may signal the merchant that the transaction is valid. If any of the data (e.g., payment card number, authentication ID, or mobile response transaction or hashed authentication ID) is not consistent, then the transaction may be rejected.

Figure 14:
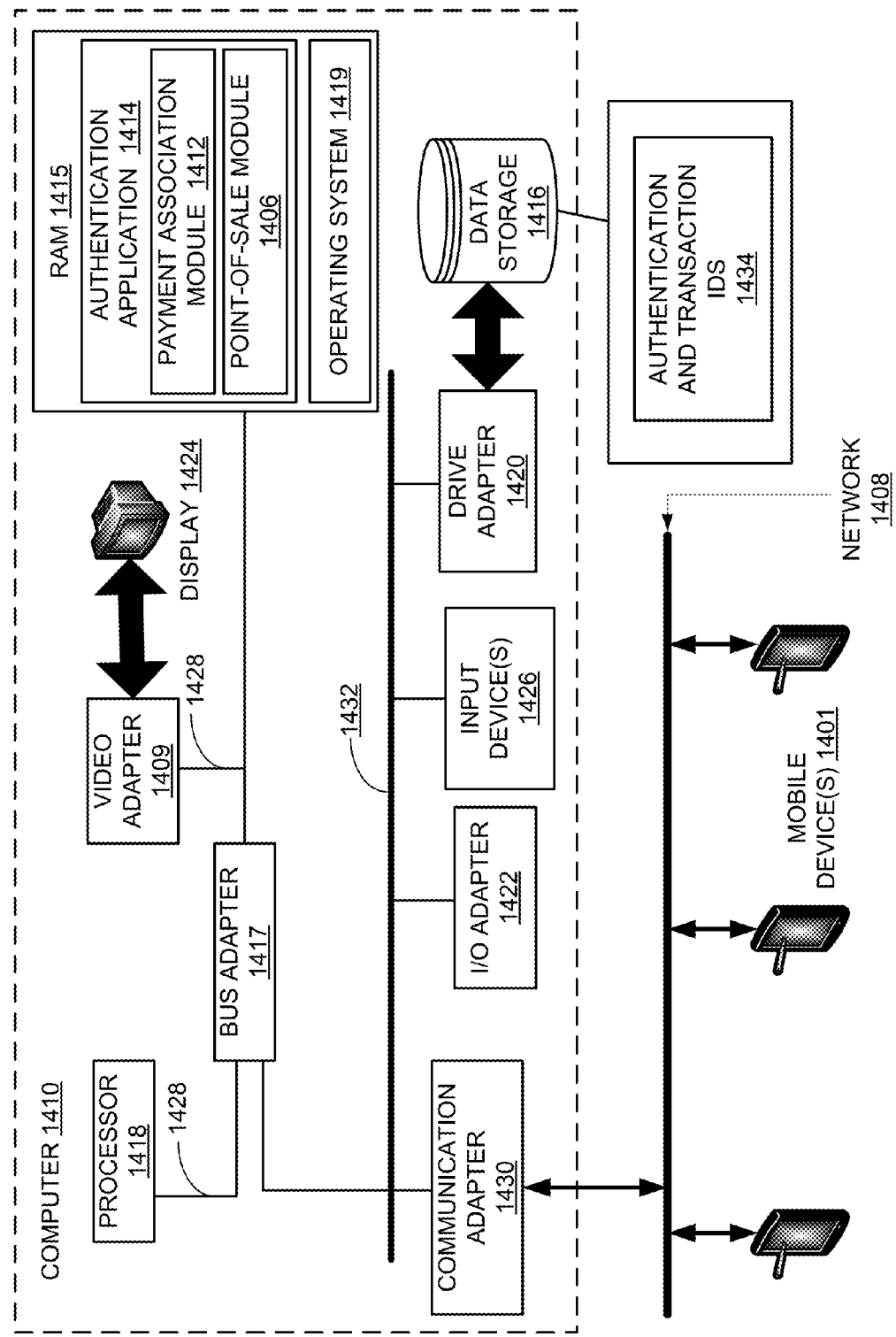
FIG. 14 depicts a block diagram of automated computing machinery, according to various embodiments.

FIG. 14 depicts a block diagram of automated computing machinery, according to various embodiments. The automated computing machinery may represent a POS terminal, a payment association server, or a payment association computing device, among others, according to various embodiments. The example computing machinery may include a computer 1410 useful in performing aspects of the disclosure, according to various embodiments. The computer 1410 of FIG. 14 includes at least one computer processor 1418 or central processing unit (CPU) as well as random access memory 1415 (RAM) which is connected through bus adapter 1417 to processor 1418 and to other components of the computer 1410. The computing machinery or the processor 1418 may include one or more computer processing circuits.

The RAM 1415 may include an authentication application 1414. The authentication application 1414 may access or control various functions of the computer's 1400 RAM 1415, according to various embodiments. The authentication application's 1414 instructions and authentication and transaction IDs 1434 may be stored to or read from data storage 1416, which may be a hard disk drive, according to various embodiments. The memory controller's communications may be received from various modules located in the RAM 1415.

The RAM 1415 may include a payment association module 1412. The payment association module's 1412 instructions may be populated into the data storage 1416. The authentication application 1414 may control when to authenticate a payment transaction. The authentication application 1414 may access a point-of-sale module 1406 and a payment association module 1412, according to various embodiments. The point-of-sale module 1406 may control oxide deposition during a FET-making process, according to various embodiments. The payment association module 1412 may control various processes associated with a payment association during a payment authentication process, according to various embodiments. The point-of-sale module 1406 and the payment association module 1412 may be stored in data storage 1416, according to various embodiments. Additional modules may be included in the authentication application 1414, according to various embodiments.

The RAM 1415 may include an operating system 1419. Operating systems useful for record filtering according to embodiments of the present disclosure include UNIX®, Linux®, Microsoft XP™, AIX®, IBM's i5/OS™, and others. The operating system 1419 is shown in RAM 1415, but many components of such software typically are stored in non-volatile memory also, such as, for example, on a disk drive 1416.

The computer 1410 may also include disk drive adapter 1420 coupled through expansion bus 1432 and bus adapter 1417 to processor 1418 and other components of the computer 1410. Disk drive adapter 1420 connects non-volatile data storage to the computer 1410 in the form of disk drive (data storage) 1416. Disk drive adapters useful in computers include Integrated Drive Electronics (IDE) adapters, Small Computer System Interface (SCSI) adapters, Serial AT Attachment (SATA), and others. Non-volatile computer memory also may be implemented for as an optical disc drive, electrically erasable programmable read-only memory (so-called 'EEPROM' or 'Flash' memory), RAM drives, etc.

The data storage 1416 may include one or more storage devices in a tiered or non-tiered configuration. The data storage 1416 may include one or more memory chip thermal profile inputs that are received by the application and stored for later use by the authentication application 1414 through RAM 1415.

The example computer 1400 may include one or more input/output (I/O) adapters 1422. I/O adapters implement user-oriented input/output through, for example, software drivers and computer hardware for controlling output to display devices such as computer display screens 1424, as well as user input from one or more user input devices 1426 such as keyboards, mice, styli, or touchscreens, according to various embodiments. The example computer 1400 may include a video adapter at 1409, which is an example of an I/O adapter specially designed for graphic output to a display device 1424 such as a display screen or computer monitor. The video adapter (I/O) would be connected to processor 1418 through a bus adapter 1417, and the front side bus 1428, which is also a high-speed bus.

The example computer 1410 includes a communications adapter 1430 for data communications with other computers, for example, mobile device(s) 1401, and for data communications with a data communications network 1408. Such data communications may be carried out serially through RS-232 connections, through external buses such as a Universal Serial Bus (USB), through data communications networks such as IP data communications networks, and in other ways as will occur to those of skill in the art. Communications adapters implement the hardware level of data communications through which one computer sends data communications to another computer, directly or through a data communications network 1408. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of skill in the art without departing from the scope and spirit of the described embodiments. The terminology used herein was chosen to best explain the principles of the embodiments, the practical application or technical improvement over technologies found in the marketplace, or to enable others of skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The invention claimed is:

1. A system for use with a host payment association server that is configured to validate transactions of a payment account and communicate with a linked mobile device that is configured to validate payment transactions, comprising:
one or more computer processor circuits that are configured to host a transaction validation application that is configured to:
receive, by a point-of-sale (POS) terminal, a first indication that a payment account of a cardholder is associated with a mobile device of the cardholder;
receive, by the POS terminal, after receiving the first indication, a second indication of physical possession of a payment card by a merchant;
receive, by the POS terminal, a purchase request for an authorization of an exchange of funds from the payment account of the cardholder to the merchant;
assign, by the POS terminal, a randomized transaction identifier to the request for the authorization of the exchange of funds;
transmit, by the POS terminal, the request for the authorization of the exchange of funds from the payment account of the cardholder to the merchant;
receive, by the POS terminal, the assigned randomized transaction identifier and a randomized authentication identifier associated with the randomized transaction identifier from a payment association, the payment association determining whether the request for the authorization of the exchange of funds is valid;
transmit, by the POS terminal, a copy of the randomized authentication identifier to the mobile device; and
receive, by the POS terminal, validation that the copy of the randomized authentication identifier transmitted to the mobile device from the POS terminal matches the randomized authentication identifier.

2. The system of claim 1, wherein the POS terminal is a physical POS terminal.

3. The system of claim 1, wherein the POS terminal is a computer-based POS terminal.

4. The system of claim 1, wherein the transaction validation application is configured to transmit, by the POS terminal, a copy of the randomized authentication identifier through the mobile device, visually.

5. The system of claim 1, wherein the transaction validation application is configured to transmit, by the POS terminal, a copy of the randomized authentication identifier through the mobile device, aurally.

6. The system of claim 1, wherein the mobile device includes a mobile device application, wherein the mobile device application is configured to communicate with the payment association and the payment account of the cardholder.

7. A computer program product comprising a computer readable storage device having a computer readable program stored therein, wherein the computer readable program, when executed on a computing device, causes the computing device to:

receive, by a point-of-sale (POS) terminal, a first indication that a payment account of a cardholder is associated with a mobile device of the cardholder;
receive, by the POS terminal, after receiving the first indication, a second indication of physical possession of a payment card by a merchant;
receive, by the POS terminal, a purchase request for an authorization of an exchange of funds from the payment account of the cardholder to the merchant;
assign, by the POS terminal, a randomized transaction identifier to the request for the authorization of the exchange of funds;
transmit, by the POS terminal, the request for the authorization of the exchange of funds from the payment account of the cardholder to the merchant;
receive, by the POS terminal, the assigned randomized transaction identifier and a randomized authentication identifier associated with the randomized transaction identifier from a payment association, the payment association determining whether the request for the authorization of the exchange of funds is valid;
transmit, by the POS terminal, a copy of the randomized authentication identifier to the mobile device; and
receive, by the POS terminal, validation that the copy of the randomized authentication identifier transmitted to the mobile device from the POS terminal matches the randomized authentication identifier.

8. The computer program product of claim 7, wherein the computer readable program further causes the computing device to:
transmit, by the POS terminal, a copy of the randomized authentication identifier through the mobile device, by a wireless transmission.

9. The computer program product of claim 7, wherein the computer readable program further causes the computing device to:
transmit, by the POS terminal, a copy of the randomized authentication identifier through the mobile device, visually.

10. The computer program product of claim 7, wherein the computer readable program further causes the computing device to:
transmit, by the POS terminal, a copy of the randomized authentication identifier through the mobile device, aurally.

* * * * *